United States Patent [19]

Sakata et al.

[11] Patent Number: 5,805,725
[45] Date of Patent: Sep. 8, 1998

[54] HANDWRITING INPUT APPARATUS

[75] Inventors: Haruhiko Sakata, Tokyo; Kimiyoshi Yoshida, Kanagawa, both of Japan

[73] Assignee: Sony Corporation, Japan

[21] Appl. No.: 908,409

[22] Filed: Aug. 7, 1997

Related U.S. Application Data

[63] Continuation of Ser. No. 371,881, Jan. 12, 1995.

[30] Foreign Application Priority Data

Jan. 28, 1994 [JP] Japan .................................. 6-008350

[51] Int. Cl.$^6$ .............................. G06K 9/00; G06K 9/46; G06K 9/66; G06F 15/00
[52] U.S. Cl. ......................... 382/187; 382/195; 382/203; 395/133
[58] Field of Search ................................. 382/187, 202, 382/195, 203; 395/133

[56] References Cited

U.S. PATENT DOCUMENTS

| | | | |
|---|---|---|---|
| 5,293,471 | 3/1994 | Ikeuchi et al. ........................ | 395/143 |
| 5,414,228 | 5/1995 | Yamashita ............................. | 382/187 |
| 5,448,475 | 9/1995 | Senoo et al. .......................... | 382/187 |
| 5,483,626 | 1/1996 | Nakayama ............................ | 395/133 |
| 5,548,695 | 8/1996 | Asano et al. .......................... | 395/133 |

Primary Examiner—Andrew W. Johns
Assistant Examiner—Monica S. Davis
Attorney, Agent, or Firm—Ronald P. Kananen

[57] ABSTRACT

A handwriting input apparatus allows erasure of a displayed figure by a simple handwritten input. When all of a sequence of handwriting points H (indicated by black dots in the figure) composing a locus of a single stroke of handwritten input is located within a proximity area (shown by broken lines in the figure) of either primitive figure obj1 or obj2 currently being displayed, this stroke is recognized as specifying an erasure and the portions of the primitive figures obj1 and obj2 which correspond to the sequence of handwriting points H are accordingly erased.

20 Claims, 32 Drawing Sheets

○ : End Point of Linear Graphic

⊂⊃ : Proximity Area of Linear Graphic

.... : Handwriting Points

| i | obj#i |
|---|---|
| 1 | o—o |
| 2 | ○ |
| 3 | ∿ |

| k | id | st | et |
|---|------|-------|-------|
| 1 | No.1 | st(1) | et(1) |
| 2 | No.2 | st(2) | et(2) |
| 3 | No.1 | st(3) | et(3) |
|   |      |       |       |

(No.i is Identification Number of obj#i)

| k | id | st | et |
|---|------|-------|-------|
| 1 | No.5 | st(1) | et(1) |
| 2 | No.6 | st(2) | et(2) |
|   |      |       |       |

| k | id | st | et |
|---|------|-------|-------|
| 1 | No.5 | st(1) | et(1) |
| 2 | No.6 | st(2) | et(2) |
| 3 | No.5 | st(3) | et(3) |
| | | | |

Overlapped section of proximity area

Point Pmax represented by maximum value of parameter

Point Pmax represented by minimum value of parameter

Sequence of handwriting point Hc

Overlapped section of proximity area

Point Pmax represented by maximum value of parameter

Point Pmax represented by minimum value of parameter

Sequence of handwriting point Hc

E3  E4

Proximity area

Handwriting point

Primitive Figure

FIG.32(a)
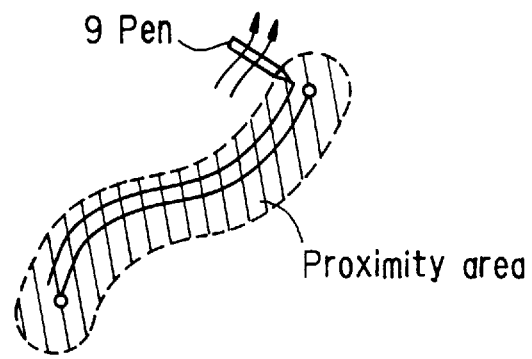
Erased
FIG.32(b)
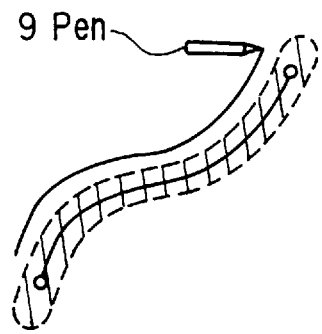
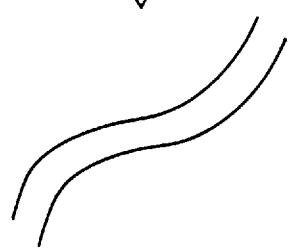

Specify "Erase"

Specify section to be erased

Erase

Select plurality of primitive figures (grouping)

Specify "Erase" for grouped figures

Specify section to be erased

Erase

HANDWRITING INPUT APPARATUS

This application is a continuation of application Ser. No. 08/371,881 filed Jan. 12, 1995.

BACKGROUND OF THE INVENTION

1. Field of the Invention

The present invention relates to a handwriting input apparatus which allows the input of characters and figures by handwriting and which can be suitably used with a portable computer or the like for example.

2. Description of the Related Art

Conventionally, in a pen input type portable computer (pen computer) which allows the input of characters and figures by handwriting, a primitive or crude figure (e.g., a linear figure whose locus may be expressed by parameters, such as a straight line, arc and spline curve) displayed on its screen, is erased by changing the function of its pen to a metaphor such as an "eraser", by touching a predetermined icon and by tracing over the existing primitive figure on its graphic editor.

Accordingly, in this case, a number of manipulations increases because the change of the function of the pen has to be designated. That is, when a line is to be erased in the middle of a graphic input for example, a designation for changing the function of the pen to the "eraser" mode has to be made before erasing the line, another designation for changing the function of the pen back to the graphic input mode has to be subsequently made, thus imparting a cumbersome feeling to its user.

In another arrangement, a pen is provided which allows a user to erase an existing primitive figure using a predetermined gesture of the pen on the primitive figure.

In such a pen type computer, although the pen needs not be manipulated in a manner to change its function independently from the manipulation for inputting handwriting, a shape recognition process for determining which of the input handwriting of the pen (locus of handwritten input made by the pen) is an erasing gesture, is necessary.

Because it is normally very difficult to reproduce what has been erased in response to an erroneously executed erasure, it is necessary to be very careful to avoid any unintentional erasure as much as possible.

On the other hand, if a handwriting (input handwriting) input which is intended as an erasure is not recognized as an erasure and is taken as an input, the number of figures increases, instead of reducing, imparting a sense of frustration to the user.

Accordingly, the pen computer in which the erasure is specified by a predetermined gesture is required to recognize such gesture accurately and reliably.

The shape recognition process for recognizing such gesture is normally composed of a dictionary for storing features of shapes of figures to be recognized and a matching process for collating the memory content in the dictionary with the handwriting input.

It is then necessary for the shapes of figures to have been described in the dictionary in detail in order to be able to obtain a stable recognition result in the shape recognition process. More specifically, when a circle is input by handwriting for example, there is no possibility that all of a perfectly true circle is input, so that it is difficult to recognize the locus of the handwritten input as a circle just by describing what approximates a true circle in the dictionary. Accordingly, a wider description about circle which abstractly expresses all kinds of deformed circles within a scope in which they can be assumed approximately as a circle as shown in FIG. 36, for example, need to be loaded into the dictionary.

However, the matching process using such dictionary in which such detailed description is made is generally complex and requires expensive computation resources, thereby increasing the size of the apparatus and cost.

Furthermore, in the pen computer in which the erasure is specified by inputting a predetermined gesture, a portion of a primitive figure B in a figure, composed of primitive figures A through C as shown in FIGS. 37a through 37c for example, is erased as follows. (In the figures, white small circles indicate edges of one primitive figure and are not part of the figures.)

That is, a predetermined gesture (e.g., a gesture of drawing a zigzag line) is input at first to specify an erasure as shown in FIG. 37a and the pen is manipulated (stroke is input) so as to draw X marks as shown in FIG. 37b for example to specify an erase section (range) where the primitive figure B is to be erased. Then, the primitive figure B in the erase section (the portion of the primitive figure B) is erased.

Accordingly, similarly to the case described above, it requires a number of cumbersome manipulations.

Further, when a portion to be erased hangs over a plurality of primitive figures, and not only a portion or whole of one primitive figure, strokes are input to group the plurality of primitive figures at first as shown in FIG. 38a, an erasure is specified (FIG. 38b), and an erase section is specified (FIG. 38c) similar to the cases in FIGS. 37a and 37b. Then, the figure in the erase section is erased as shown in FIG. 38d.

Accordingly, in this case, the number of manipulations increases further more, giving rise to an even more cumbersome sensation.

Accordingly, it is an object of the present invention to solve the aforementioned problems by providing a small and low cost apparatus which allows to simply execute an erasing operation.

SUMMARY OF THE INVENTION

In order to achieve the aforementioned goal, according to the present invention, a handwriting input apparatus for processing a figure or character string input by handwriting comprises a pen as input means for making a handwritten input, a display for displaying the figure or character string as well as a locus of the handwritten input inputted by the pen and a processing program which acts as discriminating means for discriminating an overlap state of a single stroke of locus of the handwritten input inputted by the pen with the figure or character string. The arrangement is characterized in that the whole figure or character string is erased based on the overlap state determined by the program of processing step 1.

The invention as described is characterized in that step 1 of the processing program discriminates an overlap of the locus of a single stroke of the handwritten input with a proximity area constituted of a range of a predetermined distance from the figure or character string displayed on the display.

The invention described herein also features that the predetermined distance is set at a smaller value when another figure or character string is displayed near the figure or character string and the predetermined distance is set at a larger value when no other figure or character string is displayed near the figure or character string.

According to the invention described herein, step 1 of the processing program discriminates an overlap of a proximity area constituted of a range of a predetermined distance from each of a sequence of points composing a single stroke of locus of the handwritten input with the figure or character string displayed on the display.

The invention is also characterized in that the predetermined distance from each of the points composing the locus of a single stroke of the handwritten input is set in correspondence to a handwritten input speed of the pen at each point.

The invention is also characterized in that the predetermined distance is set in correspondence to a handwritten input speed of the pen when a single stroke of locus is drawn.

The invention is also characterized in that the predetermined distance is set at a value proportional to an average speed of the handwritten input speed of the pen when a single stroke of locus is drawn.

The invention is also characterized in that the predetermined distance is set in correspondence to a display attribute value of the locus of the handwritten input displayed on the display.

The invention described herein is also characterized in that the display attribute value of locus of the handwritten input displayed on the display is its displayed width.

Yet another feature of the invention resides in that the predetermined distance is set at an input value.

Another feature of the invention resides in that it further comprises a program including processing steps which act as confirmation means for confirming, before the figure or character string is erased, that it can be erased based on the discrimination result of the processing program.

The invention additionally features in that the whole of the figure or character string, which is determined to be overlapping with the locus of a single stroke of the handwritten input by the processing program, is erased.

According to a further aspect of the invention, a portion of the figure or character string which is closest to the points composing the locus is erased along with the figure or character string which is determined to be overlapping with the locus of a single stroke of the handwritten input by the processing program.

According to yet another aspect of the invention, a handwriting input apparatus for processing a figure or character string input by handwriting comprises a display for displaying the figure or character string, a pen as specifying means for specifying an erase range of a figure or character string displayed on the display, a processing program which acts as a correcting means for correcting the erase range specified by the pen and as erasing means for erasing the figure or character string in the erase range corrected by the correcting means. The arrangement being characterized in that the processing program corrects the erase range so that its border coincides with a delimit point on the figure or character string.

According to the above aspect of the handwriting input apparatus, the delimit point is an edge-point or cross-point of the figure or character string with another figure or character string.

According to another aspect of the handwriting input apparatus described herein, the delimit point is a cross-point of the figure or character string with a border of another erase range.

According to yet another aspect of the handwriting input apparatus described herein, the figure or character string is represented by parameters.

According to still another aspect of the handwriting input apparatus described herein, a processing program functions as calculating means for calculating an erase range for erasing the figure or character string based on the overlap state determined by the processing program and, it is characterized in that the figure or character string in the erase range calculated by the calculating means is erased.

According to the handwriting input apparatus described in claim 19, it is characterized in that the figure or character string is represented by parameters, and the erase range calculated by the program of processing Step 2 is represented by minimum and maximum values which are the parameters which represent the portion of the figure or character string determined to be overlapping with the locus of the handwritten input by the program of processing Step 1.

According to the handwriting input apparatus described in claim 20, it is characterized in that the program of processing Step 2 calculates the erase range by dividing into ranges wherein the parameters monotonically increase or decrease when the parameters which represent the figure or character string within the erase range do not monotonically increase or decrease.

In the handwriting input apparatus of the present invention, an overlap state of a locus of a single stroke of handwritten input inputted by the pen 9 with a figure or character string displayed on the display 5 is discriminated and based on the overlap state, the figure or character string is erased. Accordingly, the erasure can be made by a simple manipulation. Furthermore, because it is not necessary to perform a shape recognition process on the locus input by the pen 9, the apparatus may be downsized and its cost be lowered.

Still more, in the handwriting input apparatus of the present invention, the erase range specified by the pen 9 is corrected so that its border coincides with a delimit point on the figure or character string. Accordingly, a desired range may be properly erased even if the erase range is specified roughly more or less.

The above and other related objects and features of the present invention will be apparent from a reading of the following description of the disclosure found in the accompanying drawings and the novelty thereof pointed out in the appended claims.

BRIEF DESCRIPTION OF THE DRAWINGS

FIGS. 32a and 32b are drawings depicting a processing result obtained by using the distance D calculated by the method shown in FIG. 31;

DETAILED DESCRIPTION OF PREFERRED EMBODIMENT

Figure 1:
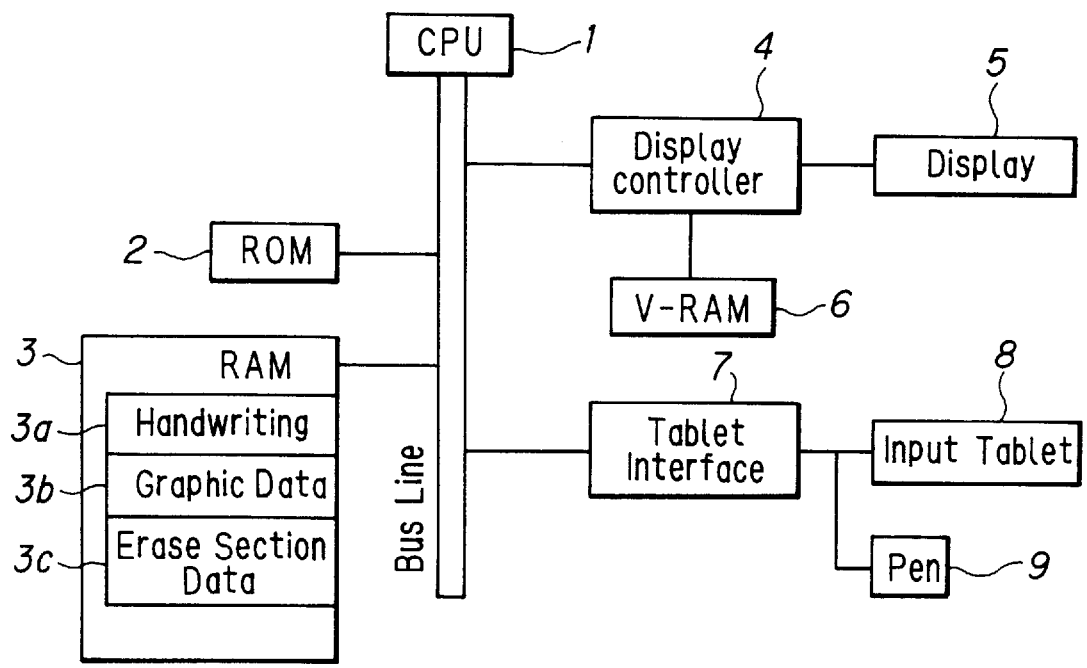
FIG. 1 is a block diagram illustrating an arrangement of one embodiment of a pen computer to which the present invention has been applied.

FIG. 1 is a block diagram illustrating an arrangement of a first preferred embodiment of a pen input type portable computer (pen computer) to which a handwriting input apparatus of the present invention is applied. A display 5 is made of a LCD for example and at the front thereof, an input tablet 8 having a transparent member disposed thereon in a manner to configure an input display screen.

When a handwritten input is made while applying an adequate pressure to the input display screen composed of the display 5 and tablet 8 by a pen 9, handwriting data representing a locus of the handwritten input is output from the tablet 8. The handwriting data is supplied to and stored in a handwriting data region 3a previously set aside in RAM 3 via a tablet interface 7 and bus.

In the RAM 3, a graphic data region 3b and erase section data region 3c for storing graphic data and erase section data (both will be described later), respectively, are also set aside, in addition to the handwriting data region 3a. Data corresponding to each region is stored in each of the regions. The RAM 3 also stores data necessary for operating a CPU 1.

Programs which correspond to processes implemented by the CPU 1, i.e., graphic editor and other programs which are described later, are coded (control coded) and stored in a ROM 2. The CPU 1 implements predetermined processings in accordance to the program stored in the ROM 2 such as a processing of data stored in the RAM 3 (e.g., a processing for converting handwriting data into graphic data), beside controlling each block composing the apparatus.

A display controller 4 reads data stored in a V-RAM 6 and supplies it to the display 5 to display. The handwriting data stored in the RAM 3 is written into the V-RAM 6 via the bus and thereby the locus of handwritten input made by the pen 9 is echoed back on to the input display screen, i.e., on the display 5 composed in one body with the tablet 8.

The graphic data stored in the RAM 3 comprises the locus input by handwriting, i.e., the handwriting data, which has been converted into fair graphic data. More specifically, if the locus input by handwriting has almost a circular shape for example, a center point and radius of a true circle which has been converted from the circular locus are calculated by the CPU 1 and are input as the graphic data together with information indicating that it is a circle (e.g., an equation of circle). When a locus having almost a straight line shape (line segment) is input by handwriting, the positions of both edges of a straight line (line segment) which has been converted from the straight locus are calculated by the CPU 1 and are input as the graphic data together with information indicating that it is a straight line (line segment) (e.g., an equation of straight line). Accordingly, the graphic data represents a primitive figure whose locus is a linear figure which may be represented by given parameters.

This graphic data is also written into, the V-RAM 6 via the bus and thereby a fair copy of the locus of handwritten input made by the pen 9, i.e., the handwriting data, is generated and is displayed on the display 5.

It should be noted that the fair copied handwriting data, i.e., the primitive figure, is displayed in place of a locus of the handwriting data when the echoed back handwriting data is defined for example.

Next, an operation of the pen computer will be explained with reference to a flowchart in FIG. 2. This pen computer is adapted so as to erase a primitive figure by tracing a section to be erased using the pen 9. That is, the start of a graphic erasing process by the graphic editor is controlled by a positional relationship between a handwritten input locus and a primitive figure already displayed on the display 5 and at the same time, information on a figure section to be erased which is handed to the graphic erasing process is calculated.

Accordingly, when one successive handwritten input (stroke input) is made by the pen 9, it is discriminated in Step 1 to determine whether the whole locus of a single stroke of the handwritten input overlaps the primitive figure already displayed on the display 5, or not. When it is determined in Step 1 that the whole locus of a single stroke does not overlap with the primitive figure, it is determined that the stroke is a stroke for inputting a figure. Then, advancing to Step 5, a conventional graphic input process (e.g., the storing process, fair copy making process, and echo back process of locus of the previous handwritten input described above) is implemented and the process is finished.

On the other hand, when it is determined in Step 1 that the whole locus of a single stroke overlaps with the primitive figure, the process advances to Step 2 to calculate a section (range) of the primitive figure which is overlapped by the locus of a single stroke as a section to be erased. Then, the process advances to Step 3.

In Step 3, a process for correcting the erase section calculated in Step 2 is carried out. In Step 4, the primitive figure within the erase section is erased and then the process is completed.

Since Steps 4 and 5 are similar to those in the conventional graphic erasing and input processes, only each process in Steps 1 through 3 will now be explained in detail.

Figure 3:
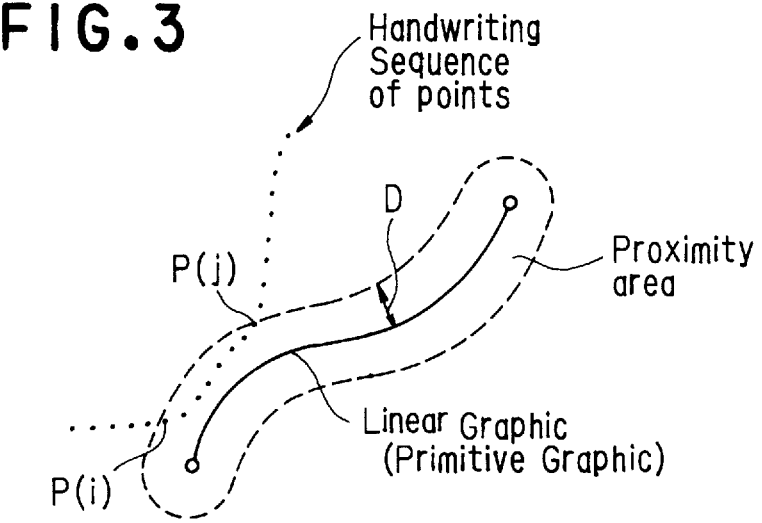
FIG. 3 is a drawing depicting a proximity area of a primitive figure.

Before explaining the overlap discriminating process in Step 1 in detail, its principle will be explained as a preliminary step. When a primitive figure, such as shown in FIG. 3, is displayed on the display 5, a range within a predetermined distance D from the figure is defined as a proximity area of the primitive figure.

When a single stroke of locus (handwriting) composed of a sequence of points (handwriting points), indicated by black dots in the figure, is made and a handwriting section composed of the sequence of handwriting points p(i) through p(j), is located within the proximity area, the handwriting section is considered to be overlapping with the primitive figure.

In Step 1, when the single stroke of whole input handwriting is composed of handwriting sections overlapped with the primitive figure (or with a plurality of primitive figures), it is determined that the whole input handwriting overlaps with the primitive figure and in this case, the CPU 1 recognizes that an erasure is specified.

When the single stroke of whole input handwriting is not composed of handwriting sections overlapped with the primitive figure, it is determined (in Step 1) that the whole input handwriting is not overlapping with the primitive figure and in this case, the CPU 1 recognizes that a handwritten input for normally inputting a figure has been made.

It should be noted that a value of the predetermined distance D which defines the proximity area may be set at a constant such as 1 mm beforehand. Additionally, it may be set, for example, at a width of a line of a handwriting (locus) echoed back to the display 5, at a width of a line when a primitive figure is displayed or at their integer times which are values dependent on graphic display attributes. Furthermore, it is possible to set the value at a larger value for a portion drawn faster by causing it to be dependent on a speed when a locus of handwritten input is drawn by the pen 9 (stroke speed) (all of which will be described later in detail).

It is also possible to set the distance D in response to a value input by an user by manipulating the pen 9 for example. In this case, the user can decides the discrimination criterion in the overlap discriminating process in Step 1 and an adjustment can be made according to a need of the user, so that the operability (convenience) of the apparatus may be improved.

Figure 4:
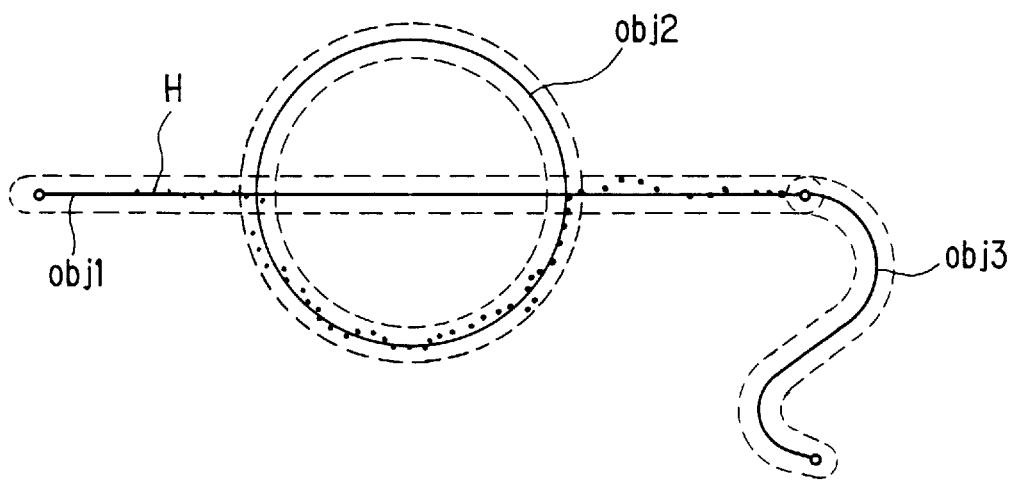
FIG. 4 is a drawing showing a state in which a handwritten input has been made whose whole body is included in a proximity area of a primitive figure.

FIG. 4 shows a state when a single stroke of handwritten input composed of a sequence of handwriting points H (portions indicated by black dots in the figure) is made, for example, when a figure composed of three primitive figures obj1 through obj3 is displayed on the display 5.

In FIG. 4, the sequence of handwriting points H is located within a proximity area of either primitive figure obj1 or obj2, so that in this case, the CPU 1 recognizes that an erasure is specified.

Figures 5, 6:
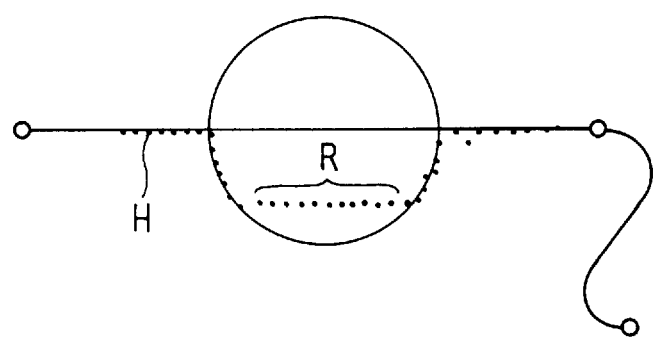
FIG. 5 is a table depicting graphic data in a graphic data region 3b in a RAM 3 in FIG. 1.
FIG. 6 is a drawing showing a state in which a handwritten input has been made whose part is not included in a proximity area of a primitive figure.

It should be noted that, in FIG. 4, each of the proximity area of the primitive figures obj1 through obj3 are indicated by broken lines. FIG. 5 shows a state wherein graphic data representing each of the primitive figures obj1 through obj3 is stored in the graphic data region 3b in the RAM 3. That is, FIG. 5 shows a state in which information on that the primitive figure obj1 is a line segment and on coordinates of its two edges, information on that the primitive figure obj2 is a circle and on a coordinate of its center point and its radius, information on that the primitive figure obj3 is a waved line and on parameters necessary for drawing it are stored as the graphic data.

On the other hand, when a single stroke of handwritten input composed of a sequence of handwriting points H, such as shown in FIG. 6, is made when the primitive figures obj1 through obj3 are displayed, a portion of the handwriting section indicated by R in the figure is not located within either of the primitive figures obj1 through obj3, so that the CPU 1 recognizes that a normal handwritten input has been made and then the graphic input process (the process in Step 5) is carried out.

Figure 7:
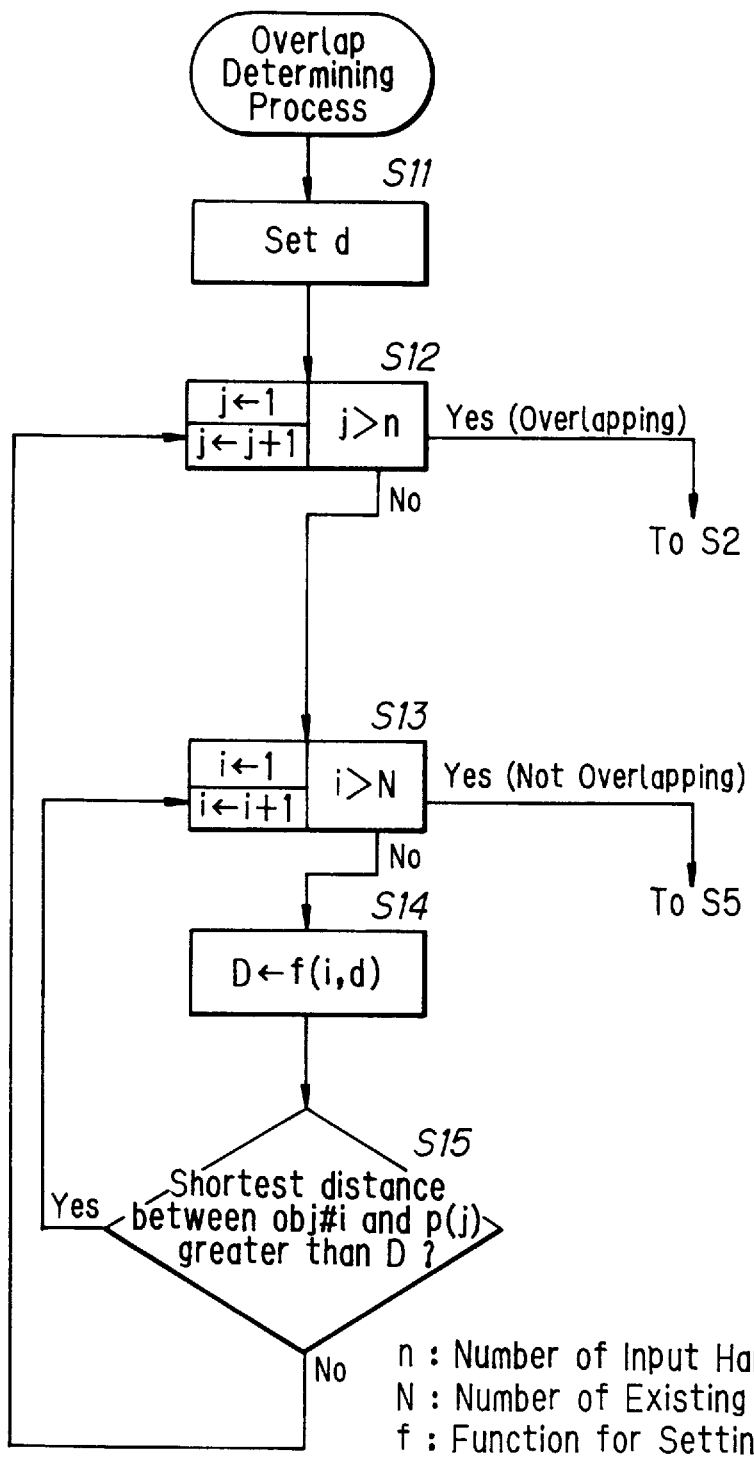
FIG. 7 is a flowchart depicting a detail of a process in Step S1 in FIG. 2.

Next, FIG. 7 is a flowchart showing the overlap discriminating process in Step 1 in detail which is carried out based on the above-mentioned principle. In Step 11, d which is an argument of a function f representing a predetermined distance D which defines the proximity area is set initially. The argument d is set at a fixed value when a value of the predetermined distance D is set at a constant as described above. When the distance D is set at a value dependent on graphic display attributes as described above, the argument d is set corresponding to the graphic display attributes. When the distance D is set at a value dependent on the stroke speed of the pen 9 as described above, the argument d is set corresponding to the stroke speed. When the distance D is set by the user as described above, the argument is set corresponding to the value input by the user.

In Step 12, 1 is set for an index j of the handwriting data (handwriting point) p(j) as an initial value and a loop control is carried out in which the index j is incremented once every time processes in Steps 13 through 15 are implemented once while repeating the processes in Step 13 through 15 until the index j is determined to be greater than a number of handwriting points n which compose a locus of a single stroke of handwritten input.

That is, Step 12 controls the processes in Steps 13 through 15 on the handwriting data p(1) through p(n) of a single stroke. Such process will be referred to as the loop control in Steps 13 through 15 substituting 1 through n for j hereinafter.

Under the loop control of Step 12, a loop control in Steps 14 and 15 substituting 1 through N (N: a number of primitive figures currently displayed on the display 5) for an index i of the primitive figure obj #1 is carried out in Step 13. It should be noted that because it becomes difficult to delimit the obj and the index j if the i-th primitive figure currently displayed on the display is described as the primitive figure obji, and as such it is described as the primitive figure obj#i throughout this specification and drawings except in the case when i is described with a number.

Under the loop control of Step 13, a value given by the function f (i, d) is defined to be the predetermined distance D, i.e., the predetermined distance D is calculated in accordance to the function f(i, d) with the arguments of the index i of the primitive figure obj#i and d set in Step 11, in Step 14.

Then, in Step 15, it is discriminated whether a shortest distance between the primitive figure obj#i and the handwriting point p(j) is greater than the predetermined distance D or not. That is, in Step 15, distances between each of the sequence of points of the primitive figure obj#i obtained from graphic data representing the primitive figure obj#i and the handwriting point p(j) are calculated and the least one among them is discriminated to determine whether it is greater than the predetermined distance D.

When the shortest distance between the primitive figure obj#i and the handwriting point p(j) is determined to be greater than the predetermined distance D in Step 15, the process returns to Step 13 to increment the index i by one. Then, the index i is checked to determine if it is greater than the total number N of the primitive figures or not. In the event that it is determined to be not greater than N, the processes in Step 14 and 15 are repeated again.

In the event that the index i is determined to be greater than the total number of primitive figures N in Step 13, i.e., the handwriting point p(j) is not located within any of the proximity areas of the primitive figures obj1 through obj#N displayed on the display 5, the locus of a single stroke of handwritten input composed of the sequence of points including the handwriting point p(j) is recognized as a locus for drawing a figure and the process advances to Step 5 (FIG. 2) to perform the graphic input process.

On the other hand, when the shortest distance between the primitive figure obj#i and the handwriting point p(j) is determined to be not greater than the predetermined distance D, i.e., when the handwriting point p(j) is located within the proximity area which is within the range of the distance D from the primitive figure obj#i, in Step 15, the process leaves the loop control of Step 13 and returns to Step 12 to increment the index j by one. Then, the index j is checked to determine whether it is greater than the total number of handwriting points of the single stroke n. In the event that it is determined to be not greater than that, the processes in Steps 13 through 15 are repeated again. That is, when a handwriting point is located within either of the proximity areas of the primitive figures currently displayed on the display 5, the same process is carried out for the next handwriting point.

Figure 2:
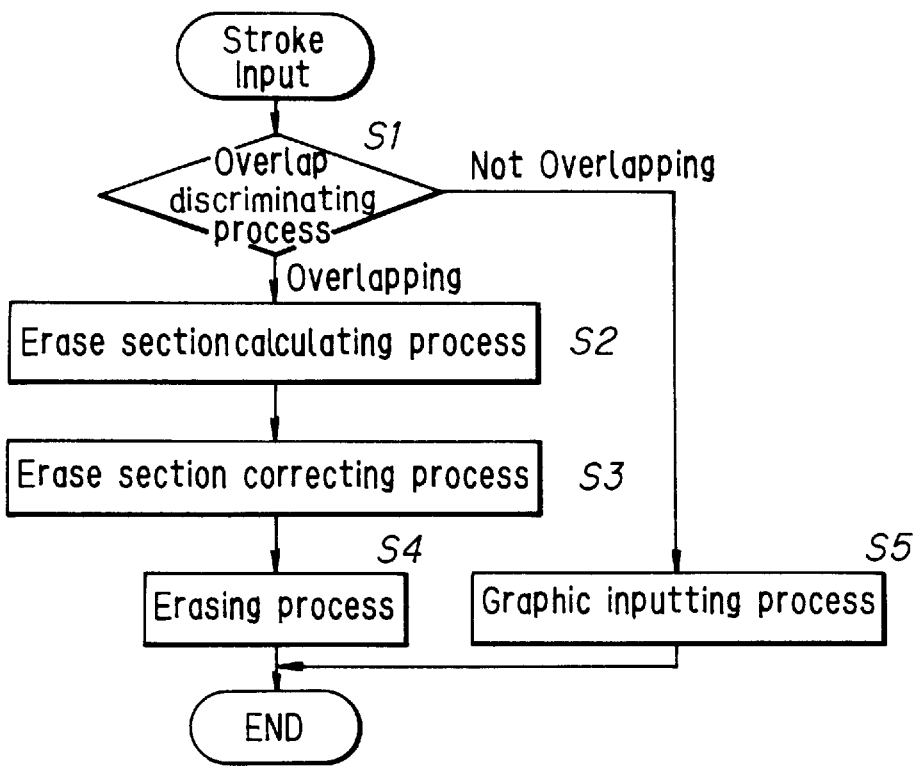
FIG. 2 is a flowchart depicting operations of the embodiment shown in FIG. 1.

Then, when the index j is determined to be greater than the total number of handwriting points n in Step 12, i.e., when all of the handwriting points p(1) through p(n) of the single stroke are located within either of the proximity areas of the primitive figures obj1 through obj#N currently displayed on the display 5, the single stroke of handwritten input composed of the handwriting points p(1) through p(n) is recognized as an input for specifying an erasure mode and the process advances to Step 2 (FIG. 2).

As described above, the stroke of input handwriting is compared with the graphic data representing the primitive figure currently displayed on the display 5 to determine if the input handwriting means to start the erasing process or not in the overlap discriminating process in Step 1. When the input handwriting is recognized as indicating that the erasing process should be started, the processes in Steps 2 through 4 are sequentially performed. When the input handwriting is recognized as not demanding the start of the erasing process, i.e., when the input handwriting is intended to input a figure, the process in Step 5 is performed.

The method for discriminating whether the input handwriting is drawn near the primitive figure (in a surrounding area including the primitive figure) or not, is not confined only to the above-mentioned method of defining the proximity area (the area determined by the predetermined distance D).

Next, in the erase section calculating process in Step 2, it is found through calculations which section (portion) of which primitive figure that the single stroke of input handwriting, recognized as specifying an erasure in Step 1, overlaps. This section is defined as an erase section. That is, in Step 2, a reference is made to the single stroke of handwriting data (sequence of handwriting points) and graphic data 25 (sequence of points composing a primitive figure represented by the graphic data) stored in the RAM 3 to prepare erase section data to be stored in the RAM 3.

Figure 8:
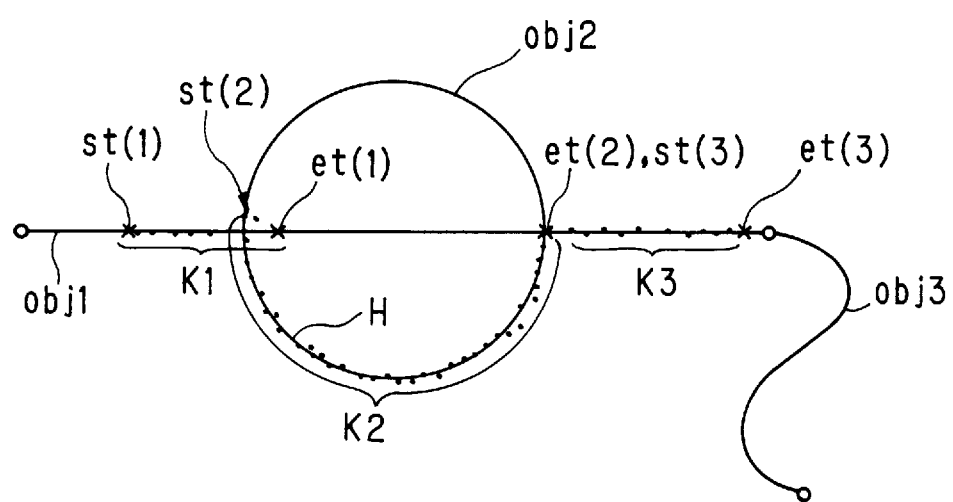
FIG. 8 is a drawing depicting erase sections calculated in Step S2 in FIG. 2.

For example, when a figure composed of three primitive figures obj1 through obj3 is displayed on the display 5 as shown in FIG. 8, and when the single stroke of handwritten input composed of a sequence of handwriting points H (indicated by black dots in the figure) is made, the sequence of handwriting points H is located within either of the proximity areas of the primitive figures obj1 and obj2. Accordingly, the CPU 1 recognizes that an erasure has been specified.

In this case, a handwriting section K1 among handwriting sections of the sequence of handwriting points H overlaps with a section between points st (1) and et(1) on the primitive figure obj1 (points obtained from the graphic data representing the primitive figure obj1). That is, the sequence of points within the handwriting section K1 among the sequence of handwriting points H is within a range of the predetermined distance D from each point from the point st(1) to the point et(1). A handwriting section K2 overlaps with a section between points st(2) and et(2) on the primitive figure obj2 and a handwriting section K3 overlaps with a section between points st(3) and et(3) on the primitive figure obj1.

In Step 2, the sections on the primitive figures which thus overlap with the handwriting sections are found as erase sections and information representing loci of the primitive figures in the erase sections is calculated as erase section data and is stored in the erase section data region in the RAM 3.

Here, the locus t of the primitive figure may be expressed as t=t(qt) using, for example, a parameter qt (by the function t(qt) having an argument of parameter qt). The parameter qt may be a length (distance) from an edge or certain reference point of the primitive figure for example or when the primitive figure is a circle, the parameter qt may be an angular displacement from a certain reference point in a certain reference direction for example. In the present embodiment, the parameter qt is adopted as information representing the locus of the primitive figure in the erase section.

Information representing the locus of the primitive figure in the erase section is not confined only to the parameter qt. Furthermore, in the present specification and drawings, st(k) and et(k) represent start and end points of the locus of the primitive figure in the k-th erase section (k: integer) as well as parameters corresponding to the start and end points as necessary (there is no problem to do this since a point on a locus of a primitive figure corresponds with a parameter one-to-one).

Figures 9, 10:
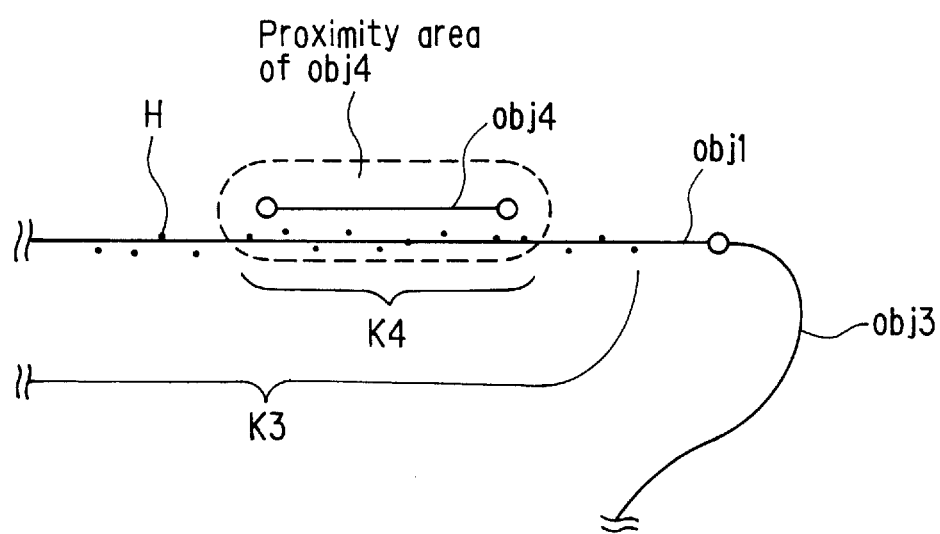
FIG. 9 is a table depicting erase section data stored in an erase section data region 3c in the RAM 3 in FIG. 1.
FIG. 10 is a drawing showing a state in which proximity areas of two primitive figures overlap from each other.

Next, FIG. 9 shows a state in which calculated erase section data corresponding to the erase sections K1 through K3 in FIG. 8 is stored in the RAM 3. In the figure, k is an index given to a found erase section and id is an identification number of a primitive figure having a section defined to be erased (an unique number which the graphic editor gives to each primitive figure in order to discriminate a plurality of primitive figures). st(k) and et(k) are edge points of the primitive figure in the k-th erase section, i.e., parameter values indicating the starting and end points of the k-th erase section.

The parameter should sequentially increase (decrease) from one edge or reference point of the primitive figure and hence, the start point st or end point et of the primitive figure in an erase section should be points represented by a minimum or maximum parameter in the erase section.

Therefore, the erase section data shown in FIG. 9 indicates that the first erase section K1 is a section within the locus of the primitive figure obj1 (No. #i is an identification number of the primitive figure obj#i) and is a section composed of a sequence of points in which the parameter corresponds from st(1) to et(1). The data also indicates that the second erase section K2 is a section within the locus of the primitive figure obj2 and is a section composed of a sequence of points in which the parameter corresponds from st(2) to et(2) and that the third erase section K3 is a section within the locus of the primitive figure obj1 and is a section composed of a sequence of points in which the parameter corresponds from st(3) to et(3).

In calculating an erase section in a case when there is a primitive figure obj4 near the erase section K3 in FIG. 8 and the sequence of handwriting points H is located not only within the proximity area of the primitive figure obj1 but also within a proximity area of the primitive figure obj4 as shown in FIG. 10 for example, i.e., when the sequence of handwriting points H overlaps not only with the primitive figure obj1 but also with the primitive figure obj4, the following two methods are conceivable as a method for calculating an erase section: a method in which all primitive figures which overlap with the sequence of handwriting points H (both of the primitive figures obj1 and obj4 in the case of FIG. 10) become objects for calculating the erase section (hereinafter referred to as an indiscriminate method) and a method in which a primitive FIG. which is closest to the sequence of handwriting points H becomes an object for calculating the erase section (hereinafter referred to as a selective method).

In the case shown in FIG. 10, there is a room for choice whether the both of the section K3 on the primitive figure obj1 and the section K4 on the primitive figure obj4 should be erased or only one of them should be erased. Then, the pen computer shown in FIG. 1 is adapted to allow the user to set whether it is desired to erase the neighboring primitive figures together or to erase them individually, i.e., by the indiscriminate method or by the selective method.

This setting can be made in response to a manipulation of a setting icon (manipulated by the pen 9) displayed on the display 5 (under a control of an application program for example) or of a setting button provided on the pen computer.

Figure 11:
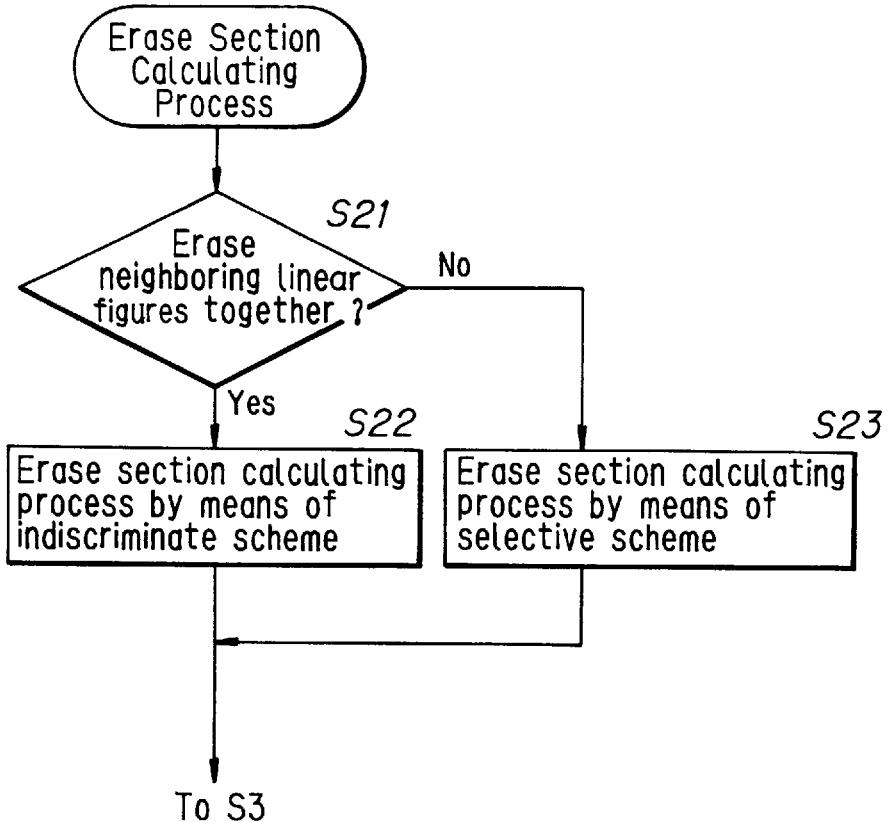
FIG. 11 is a flowchart depictinga detail of a process in Step S2 in FIG. 2.

Accordingly, in Step 2, it is discriminated in Step 21 in a flowchart in FIG. 11 wheter the pen computer is set in a mode for erasing the neighboring primitive figures (linear figures) together or not. When it is determined in Step 21 that the mode for erasing the neighboring primitive figures together is being set, i.e., when the setting icon or setting button is manuipulated to set the mode by which the pen computer will erase the neighboring primitive figures together, the process advances to Step 22 to perform the erase section calculating process by means of the indiscriminate method (detail of which will be described later).

When it is determined in Step 21 that the mode for ersing the neighboring primitive figures together is not being set, i.e., when the setting icon or setting button is manipulated to obviate the mode by which the pen computer will simultaneously erase neighboring primitive figures, the process advances to Step 23 to perform the erase section calculating process by means of the selective method (detail of which will be described later).

The setting of the modes described above may be managed by using a flag (or the like) which is altered in response to the manipulation of the setting icon or setting button or be managed by some other arbitrary method.

Furthermore, the process in Step 2 may be constructed only by either one process of Step 22 or 23 considering a cost of the apparatus for example, not constructing by the processes in Steps 21 through 23 as shown in FIG. 11.

Figures 12A, 12B:
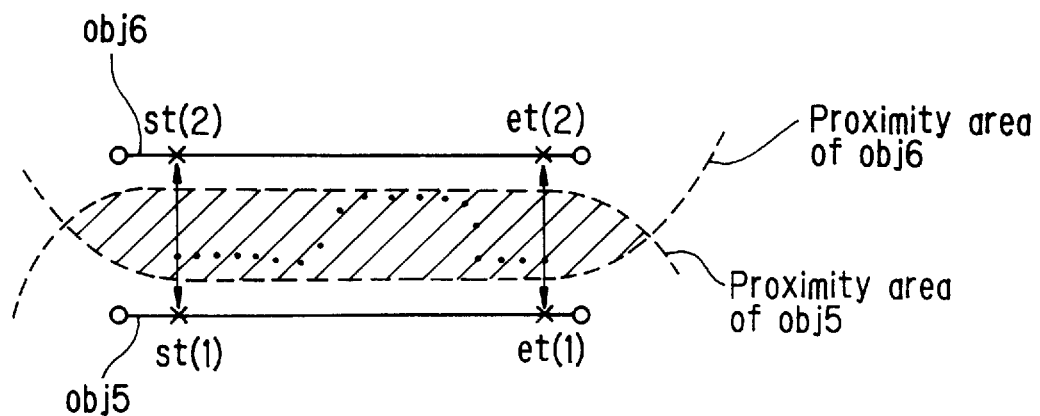
FIGS. 12a and 12b are drawing and table depicting a process in Step S22 in FIG. 11.

For example, when a single stroke of handwritten input composed of a sequence of handwriting points (indicated by black dots in the figure) which overlaps with both of neighboring primitive figures obj5 and obj6 (contained in a duplicated part of proximity areas of the both (the hatched part in the figure)) is made as shown in FIG. 12a, erase section data for erasing loci of the primitive figure obj5 from points st (1) to et(1) and of the primitive figure obj6 from points st(2) to et(2) is prepared as shown in FIG. 12b in which the both of the primitive figures obj5 and obj6 are objects for calculating the erase section according to the erase section calculating process by means of the indiscriminate method in Step 22.

Accordingly, it allows to erase close primitive figures by a single stroke of handwritten input.

Figures 13A, 13B:
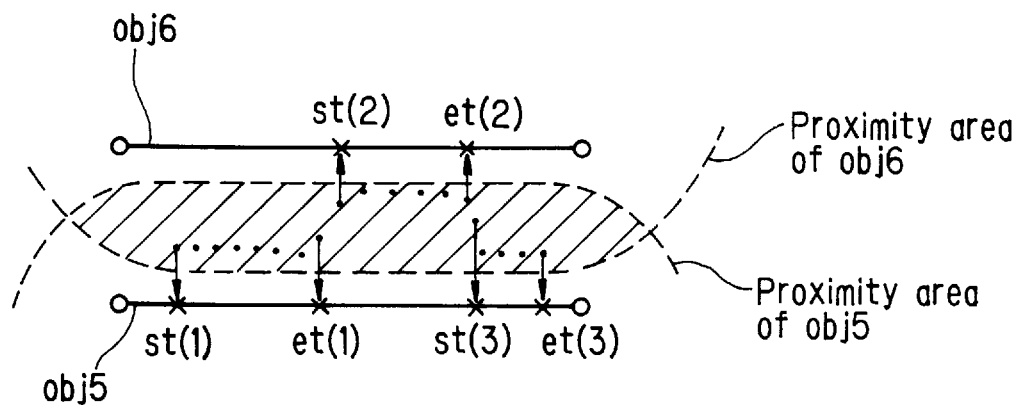
FIGS. 13a and 13b are drawing and table depicting a process in Step S23 in FIG. 11.

Furthermore, when a single stroke of handwritten input composed of a sequence of handwriting points (indicated by black dots in the figure) which overlaps with both of the neighboring primitive figures obj5 and obj6 (contained in the duplicated part of proximity areas of the both (the hatched part in the figure)) is made as shown in FIG. 13a, erase section data for erasing loci of the primitive figure obj5 from the points st (1) to et(1) and from points st(3) to et(3) and of the primitive figure obj6 from the points st(2) to et(2) is prepared as shown in FIG. 13b in which the primitive figure closest to respective sequence of handwriting points becomes an object for calculating the erase section according to the erase section calculating process by means of the selective method in Step 23.

Accordingly, it allows the user to erase only desirable sections by making a single stroke of handwritten input at the position closest to a primitive figure to be erased even if the primitive figures are crowded.

Next, the erase section calculating process by means of the indiscriminate method in Step 22 in FIG. 11 will be explained in detail with reference to a flowchart shown in FIG. 14. At first, in Step 31, a loop control in Step 32 is performed by substituting 1 through N (N: total number of primitive figures currently displayed on the display 5) for the index i of the primitive figure obj#i. In Step 32, zero is set as an initial value for a variable c(i) which is included in the proximity area of the primitive figure obj#i (located within the proximity area) for counting a number of handwriting points in one erase section.

Accordingly, the variables c(1) through c(N) are initialized in Step 32 under the loop control of Step 31.

When the index i becomes greater than the total number of the primitive figures N, the process leaves the loop control of Step 31 and advances to Step 33. In Step 33, a loop control in and after Step 34 is performed by substituting 1 through n (n: a number of handwriting points composing a locus of the single stroke of handwritten input) for the index j of handwriting data (handwriting points) p(j). Then, under the loop control of Step 33, a loop control in and after Step 35 is performed by substituting 1 through N for the index i.

In Step 35, a value of a variable q is set for a variable q, (i) and a point which is closest to the handwriting point p(j) among points on the primitive figure obj#i (graphic data representing the primitive figure obj#i) is found and is set for the variable q.

Accordingly, a point closest to a handwriting point p(j−1) among the points on the primitive figure obj#i is stored in the variable q'(i). When the index j is 1, a dummy value is set for the variable q'(i).

After the process in Step 35, it is discriminated in Step 36 whether a distance between the handwriting point p(j) and the point (variable) q, i.e., a shortest distance from the primitive figure obj#i to the handwriting point p(j), is greater than the predetermined distance D or not.

When it is determined in Step 36 that the distance between the handwriting point p(j) and the point q is not greater than the predetermined distance D, i.e., when the handwriting point p(j) is contained in the proximity area of the primitive figure obj#i, the process advances to Step 37 to set the value of the variable qt for the variable qt'(i) and to find a parameter representing the point q to set it as the variable qt.

Accordingly, a parameter corresponding to the above-mentioned point (variable) q'(i) is stored in the variable qt'(i). When the index j is 1, a dummy value is set also for the variable qt'(i), similarly to the variable q'(i).

As described above, when the distance between the point q, which is closest to the handwriting point p(i) among the points on the primitive figure obj#i and the handwriting point p(j), is less than the predetermined distance D, the parameter qt which corresponds to the point q is found in Step 37 and it is determined whether the variable c(i) is zero or not in Step 38.

When the variable c(i) is determined to be zero in Step 38, i.e., the point q found in Step 35 is what is located in an erase section not yet calculated of the primitive figure obj#1 (when the handwriting point p(j−1) is not contained in the proximity area of the primitive figure obj#i), the point q represented by the parameter qt found in Step 37 is defined as a candidate of the start point or end point of the erase section in the primitive figure obj#i. Then in Step 39, the parameter qt is set for the parameter st or et which represents the parameter candidate which corresponds to the start point or end point, respectively.

In Step 40, the variable c(i) is incremented by one and returning to Step 34, the processes in and after Step 35 are performed again under the loop control of Step 34.

On the other hand, when it is determined that the variable c(i) is not zero in Step 38, i.e., when the point q found in Step 35 is one in the erase section currently calculated of the primitive figure obj#i, the process advances to Step 30 to perform a variable conversion for substituting the variable q' or qt' respectively for the variable q'(i) or qt'(i).

The variables q' and qt' obtained as a result of the variable converting process in Step 30 are used in a special process for closed figures in Step 41.

After finishing the process in Step 30, the process advances to Step 42 via Step 41 which will be described later (however, the process may advance to Step 39 depending on a result of the process in Step 41 as described later) to discriminate whether the parameter qt found in Step 37 is smaller than the parameter candidate st which corresponds to the start point of the erase section of the object figure obj#i or not.

When the parameter qt is determined to be smaller than the parameter candidate st which corresponds to the start point of the erase section of the object figure obj#i in Step 42, the parameter qt is set for the parameter candidate st which corresponds to the start point in Step 43. The process then advances to Step 40.

When the parameter qt is determined to be not less than the parameter candidate st which corresponds to the start point of the erase section of the object figure obj#i in Step 42, it is determined in Step 44 if the parameter qt found in Step 37 is greater than the parameter candidate et which corresponds to the end point of the erase section of the object figure obj#i or not.

When the parameter qt is determined to be greater than the parameter candidate et which corresponds to the end point of the erase section of the object figure obj#i in Step 44, the parameter qt is set for the parameter candidate et which corresponds to the end point in Step 45. The process then advances to Step 40.

When the parameter qt is determined to be not greater than the parameter candidate et which corresponds to the end point of the erase section of the object figure obj#i in Step 44, the process advances to Step 40, skipping Step 45.

In Steps 42 through 45, the parameter candidate st or et which respectively corresponds to the start point or end point of the erase section is updated corresponding to the newly found handwriting point contained in the proximity area of the primitive figure obj#i as described above.

On the other hand, when the distance between the handwriting point p(j) and the point q is determined to be greater than the predetermined distance D in Step 36, i.e., the handwriting point p(j) is not contained in the proximity area of the primitive figure obj#i, the process advances to Step 46 to discriminate whether the variable c(i) is equal to zero or not. When the variable c(i) is determined to be equal to zero in Step 46, i.e., the handwriting point p(j−1) is not contained in the proximity area of the primitive figure obj#i, the process returns to Step 34 to repeat the processes in and after Step 35 under the loop control of Step 34. That is, only i is incremented by one and the processes in and after Step 35 are carried out on the next primitive figure.

When the variable c(i) is determined to be not equal to zero in Step 46, the process advances to Step 47 to initialize the variable c(i) (zero is set as an initial value).

In Step 48, the index k explained with reference to FIG. 9 is incremented by one at first. The index k is initialized to zero just before the erase section calculating process by means of the indiscriminate method in FIG. 14 is initiated.

Furthermore, in Step 48, a value stored in the variable st representing the parameter candidate which corresponds to the start point is set as a parameter st(k) which corresponds to the start point of the k-th erase section, a value stored in the variable et representing the parameter candidate which corresponds to the end point is set as a parameter et(k) which corresponds to the end point of the k-th erase section and the identification number of the primitive figure obj#i is set as a variable id(k).

Then, the index k, variable id(k), parameters st(k) and et(k) are transferred to the erase section data region in the RAM 3 and are stored as erase section data as shown in FIG. 12b.

After that, the process returns to Step 34 to repeat the processes in and after Step 35 under the loop control of Step 34.

Then, when the incremented index i is determined to be greater than N in Step 34, i.e., the processes in and after Step 35 are performed on all of the primitive figures currently displayed on the display 5, the process returns to Step 33 to repeat the processes in and after Step 34 under the loop control of Step 33 until when the incremented index j is determined to be greater than n.

When the incremented index j is determined to be greater than n in Step 33, i.e., the processes in and after Step 34 are performed on all of the handwriting points composing the locus of the stroke of handwritten input, the erase section calculating process by means of the indiscriminate method is finished and the process continues to Step 3 in FIG. 2.

Thus, the erase section data as shown in FIG. 12b is prepared in the case shown in FIG. 12a by the process described above in which the both of the primitive figures obj5 and obj6 become the objects for calculating the erase section.

Next, the erase section calculating process using of the selective method in Step 23 in FIG. 11 will be explained in detail with reference to the flowchart shown in FIG. 15. In Step 51, −1 is set for the index k explained with reference to FIG. 9 as an initial value and zero is firstly set as the initial value of a parameter prI described later.

Figure 14:
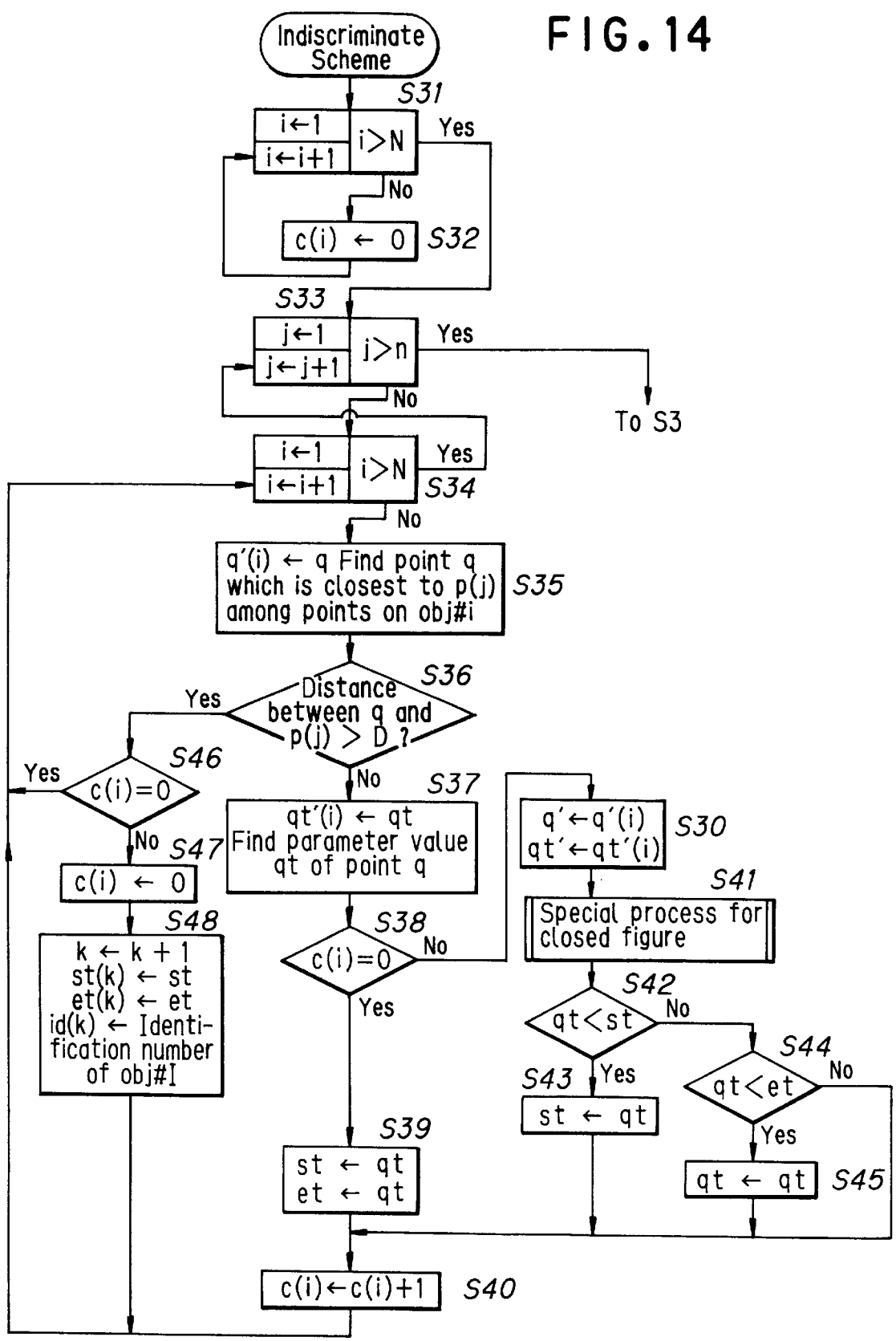
FIG. 14 is a flowchart depicting the process of Step S22 in FIG. 11 in detail.

Then, the process advances sequentially through Steps 52 through 54 to perform processes similar to those in Steps 31 through 33 explained in FIG. 14.

In Step 49, the predetermined distance D as an initial value is set for a variable min which represents a minimum value among distances between the handwriting point p(j) and each of the primitive figures currently displayed on the display 5. After that, the process advances sequentially through Steps 55 through 57 to perform processes similar to those in Steps 34 through 36 explained in FIG. 14.

Then, when the distance between the handwriting point p(j) and the point q is determined to be greater than the predetermined distance D in Step 57, i.e., when the handwriting point p(j) is not contained in the proximity area of the primitive figure obj#i, the process returns to Step 55 to repeat the processes in and after Step 56 under the loop control of Step 55. That is, i is incremented by one and the processes in and after Step 56 are performed on the next primitive figure.

On the other hand, when the distance between the handwriting point p(j) and the point q is determined to be not greater than the predetermined distance D in Step 57, i.e., the handwriting point p(j) is contained in the proximity area of the primitive figure obj#i, the process advances to Step 58 to discriminate whether a value stored in the variable min is greater than the distance between the handwriting point p(j) and the point q. When the value stored in the variable min is determined to be not greater than the distance between the handwriting point p(j) and the point q in Step 58, the process returns to Step 55 to repeat the processes in and after Step 56 under the loop control of Step 55.

When the value stored in the variable min is determined to be greater than the distance between the handwriting point p(j) and the point q in Step 58, the process advances to Step 59 to set the value of variable qt for the variable qt' (i) and to find a parameter representing the point q to set it for the variable qt similarly to the case in Step 37 explained in FIG. 14.

Then, the process advances to Step 60 to set the index i of the primitive figure obj#i for the variable I and to set the distance between the handwriting point p(j) and the point q for the variable min and then returns to Step 55.

Accordingly, the minimum value among the distances between the handwriting point p(j) and respective primitive figures currently displayed on the display 5 is set as the variable min and an index of a primitive figure whose distance from the handwriting point p(j) is least is stored in the variable I by repeating the processes in Steps 56 through 60 under the loop control of Step 55.

After that, when the incremented index i is determined to be greater than N in Step 55, the process leaves the loop control of Step 55 and advances to Step 61 to discriminate whether a variable c(I) is equal to zero or not. When the variable c(I) is determined to be equal to zero in Step 61, i.e., the primitive figure closest to the handwriting point p(j−1) is not the primitive figure obj#I, the process advances to Step 62 to increment the index k by one.

Further, in Step 62, the value stored in the parameter st representing the parameter candidate which corresponds to the start point is set as the parameter st(k) which corresponds to the start point of the k-th erase section, the value stored in the parameter et representing the parameter candidate which corresponds to the end point is set as the parameter et(k) which corresponds to the end point of the k-th erase section and the identification number of the primitive figure obj#prI is set for the variable id(k).

Then, the index k, variable id(k), parameters st(k) and et(k) are transferred to the erase section data region in the RAM 3 and are stored as erase section data as shown in FIG. 13 for example.

Here, a value of the variable I is set as the variable prI in Step 63 described later and therefore, the value which has been set as the variable I in the previous process in Step 60 (index of the primitive figure which is closest to the handwriting point p(j)) is stored.

When the index k incremented in Step 62 is zero, the index k, variable id(k) and parameters st(k) and et(k) are ignored and are not stored in the RAM 3.

In Step 63, the variable c(prI) is initialized (zero is set as the variable c(prI) as an initial value) and the value stored in the variable I is set for the variable prI.

In Step 64, the parameter qt is set as the variable st or et representing the parameter candidate which corresponds to the start point or end point of the erase section of the primitive figure obj#i similarly to the case in Step 39 in FIG. 14.

In Step 65, the variable c(I) is incremented by one and then the process returns to Step 54 to repeat the processes in and after Step 55 under the loop control of Step 54.

On the other hand, when the variable c(I) is determined to be not zero in Step 61, the process advances to Step 67 via the variable converting process in Step 50 or the special process for closed figures in Step 66 which are the same processes respectively with those in Steps 30 and 41 in FIG. 14 (however, the process may advances to Step 62 depending on a processing result in Step 66 as described later).

Since Steps 67 and 70 are the same processes with those in Steps 42 and 45 in FIG. 14, an explanation thereof will be omitted here. After finishing the process in Step 68 or 70, the process returns to Step 54 via Step 65.

After that, when the incremented index j is determined to be greater than n in Step 54, i.e., the processes in and after Step 55 are performed on all of the handwriting points composing the locus of the single stroke of handwritten input, the erase section calculating process by means of the selective method is finished and the process advances to Step 3 in FIG. 2.

The erase section data as shown in FIG. 13b is prepared in the case shown in FIG. 13a for example by the process described above in which the primitive figure which is closest to the handwritten input becomes the object for calculating the erase section.

Figure 16A:
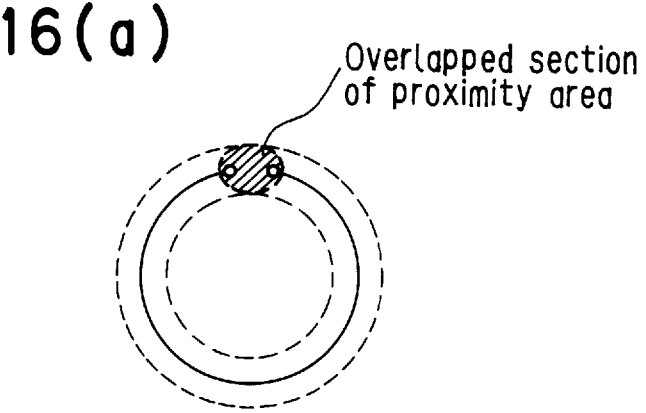
FIGS. 16a, 16b and 16c are drawings depicting a closed figure.

When a proximity area of one primitive figure is duplicated as shown in FIG. 16a for example (hereinafter such primitive figure shall be referred to as a closed figure) and when a single stroke of handwritten input composed of a sequence of handwriting points Hc contained in the proximity area is made passing through the duplicated portion (overlap portion), a maximum value or minimum value of a parameter in the closed figure section which corresponds to the handwriting section does not correspond to each of two edge points (start and end points) of that section.

That is, because the parameter increases sequentially from an edge of a primitive figure for example as described before and if the parameter is minimum at an edge Pmin of the primitive figure and increases from that point along the locus, becoming maximum at an edge Pmax, each point where the parameter becomes minimum or maximum in the closed figure section which corresponds to the sequence of handwriting points Hc is not the two edges (start and end points) of that section, but the point Pmin or Pmax.

Figure 15:
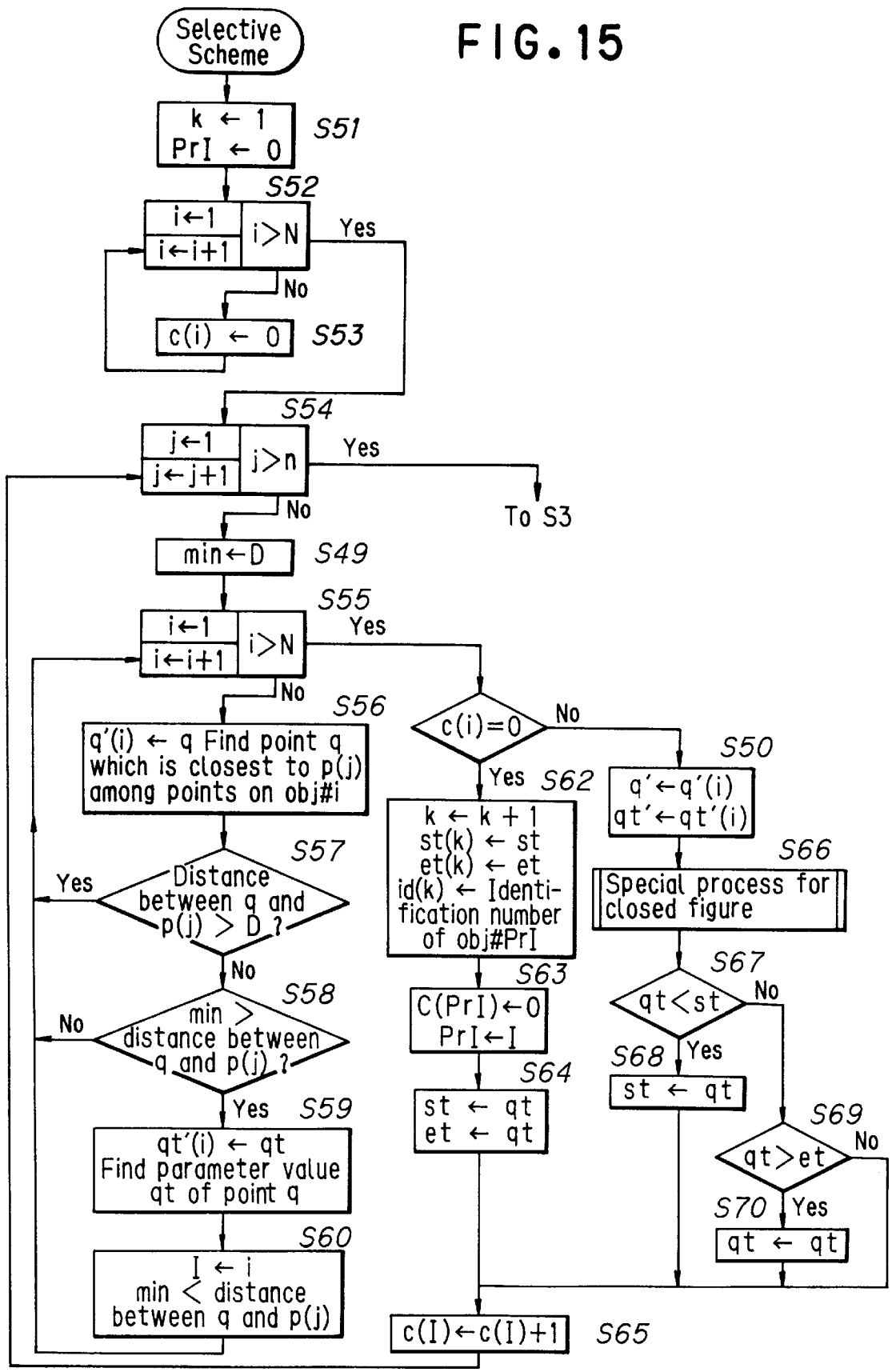
FIG. 15 is a flowchart depicting the process of Step S23 in FIG. 11 in detail.
Figure 16B:
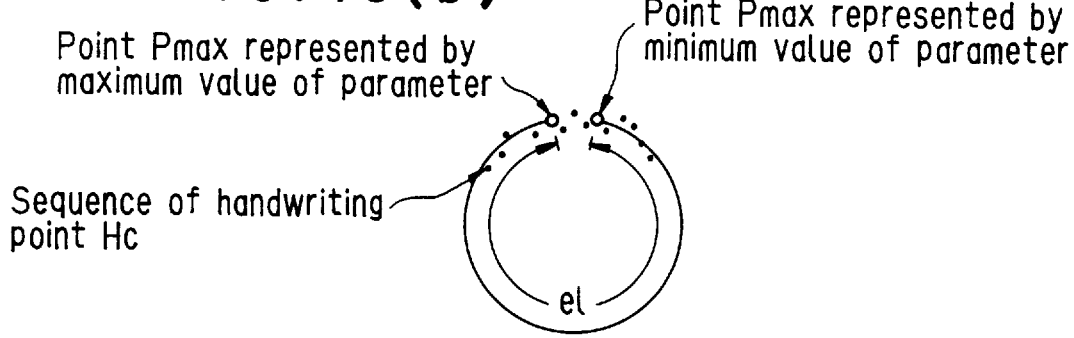

Because the erase section calculating process for calculating the point where the parameter becomes minimum or maximum in the section of the primitive figure which overlaps with the sequence of handwriting points Hc as the start or end point of the erase section of the primitive figure is performed in both Steps 22 (FIG. 14) and 23 (FIG. 15) described above and if the parameter which represents a section (portion) of a primitive figure which overlaps with a sequence of handwriting points does not monotonically increase or decrease as shown in FIG. 16b, the point Pmin or Pmax is defined to be the start or end point of the erase section and as a result, a section indicated by e1 is determined to be the section to be erased.

Accordingly, in this case, the whole closed figure is erased by the handwritten input which has been intended to erase only a portion of the closed figure.

Figure 17A:
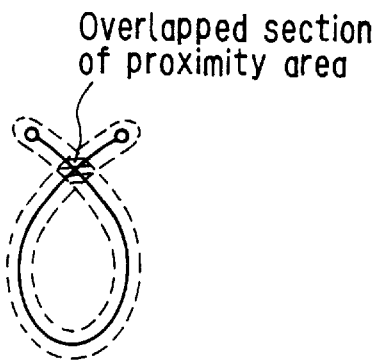
FIGS. 17a, 17b and 17c are drawings depicting another closed figure.
Figure 17B:
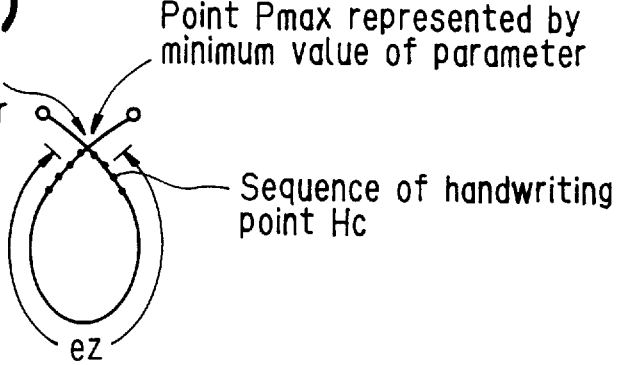

The same applies to a closed figure whose proximity area is duplicated because its locus crosses as shown in FIG. 17a and a section e2 is erased when the stroke of handwritten input composed of a sequence of handwriting points Hc contained in its proximity area is made passing through the duplicated portion as shown in FIG. 17b.

Because such erroneous erasure is caused when the handwritten input is made passing through the duplicated portion of the proximity area of the closed figure, it is discriminated whether such handwritten input has been made in the special process for closed figure in Step 41 in FIG. 14 (also same in Step 66 in FIG. 15). When such input has been made, a process for dividing the erase section, which is originally one erase section, at the duplicated portion is performed to be able to express the erase section by a parameter which monotonically increases or decreases.

Figure 16C:
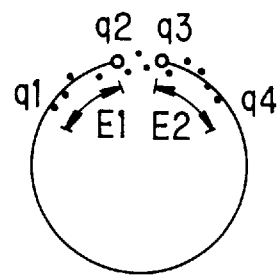

That is, in the special process for closed figure, when the handwritten input as shown in FIG. 16b is made to the closed figure shown in FIG. 16a for example, the section of the closed figure which corresponds to the handwritten input is divided into sections E1 and E2 as shown in FIG. 16c to define those two sections as the sections to be erased.

Figure 17C:
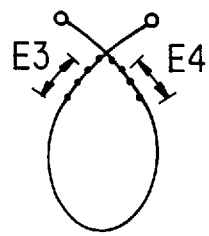

Furthermore, when the handwritten input as shown in FIG. 17b is made to the closed figure shown in FIG. 17a for example, the section of the closed figure which corresponds to the handwritten input is divided into sections E3 and E4 as shown in FIG. 17c to define those two sections as the sections to be erased.

Figure 18:
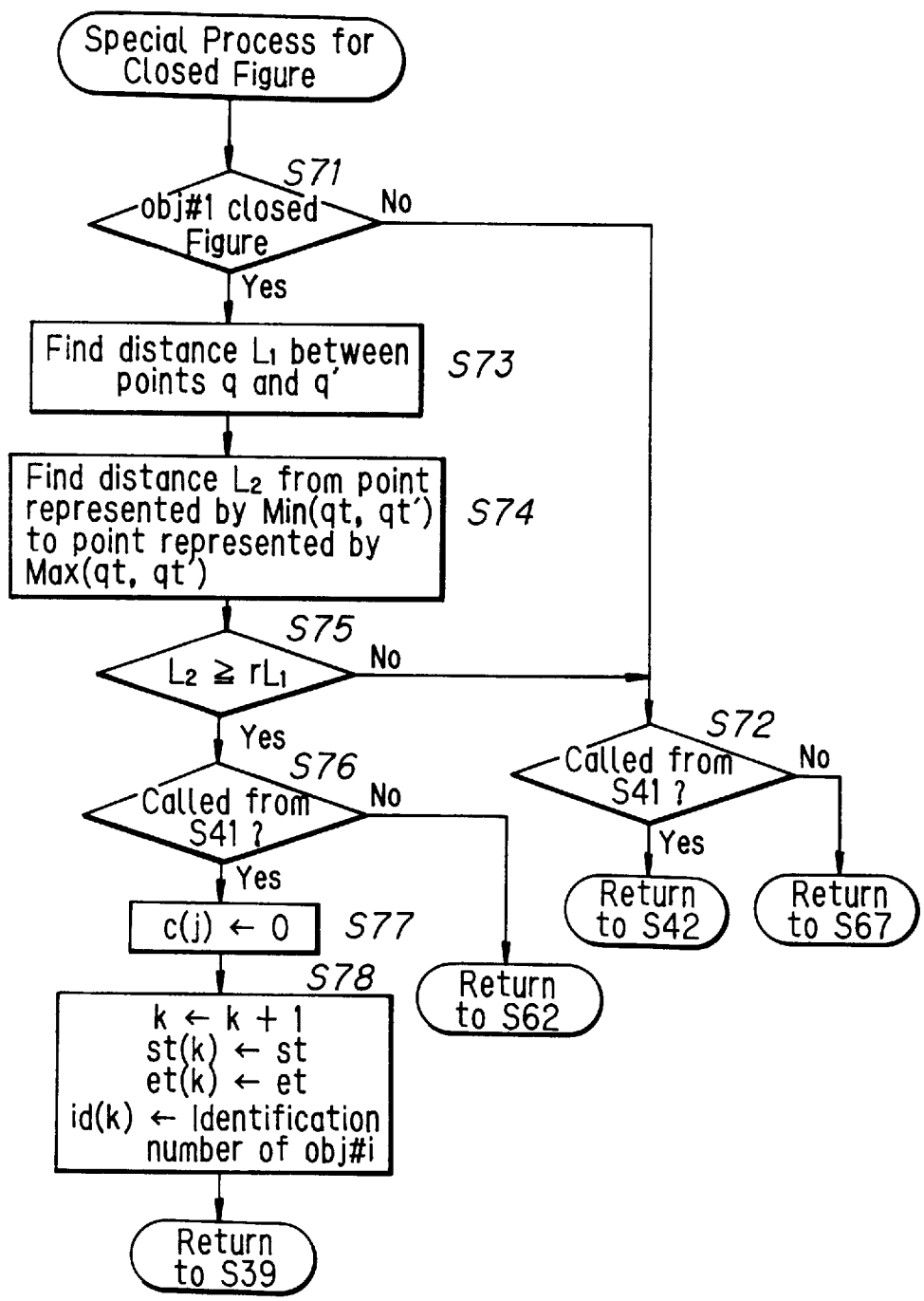
FIG. 18 is a flowchart depicting in detail a special process for closed figures in Step S41 in FIG. 14 and Step S66 in FIG. 15.

Next, the special process for closed figure will be explained in detail with reference to a flowchart in FIG. 18. This special process for closed figure is sub-routinized (moduled) to be able to be called in Step 41 in FIG. 14 and in Step 66 in FIG. 15.

In the special process for closed figure, it is firstly discriminated whether the primitive figure obj#i is a closed figure or not in Step 71. This determination is performed for the proximity area of the primitive figure obj#i by detecting whether it has a duplicated portion or not.

When the primitive figure obj#i is determined to be not a closed figure in Step 71, i.e., the proximity area of the primitive figure obj#i has no duplicated portion, the process advances to Step 72 to discriminate whether the special process for closed figure is what is called for in Step 41 in FIG. 14 or not. When the subroutine is called, a program address (step) in making the call is normally held in a stack assured in the RAM 3 beforehand, and this discrimination is made by making reference to a stored value in the stack.

When the special process for closed figure is determined to be what is called in Step 41 in FIG. 14 in Step 72, it is returned to Step 42 in FIG. 14.

When the special process for closed figure is determined to be not what is called in Step 41 in FIG. 14 in Step 72, i.e., the special process for closed figure is what is called in Step 66 in FIG. 15 and it is returned to Step 67 in FIG. 15.

On the other hand, when the primitive figure obj#i is determined to be a closed figure in Step 71, the process advances to Step 73 to find a distance $L_1$ between a point q on the primitive figure obj#i (point on the locus of the primitive figure obj#i which is closest to the handwriting point p(j) within the proximity area of the primitive figure obj#i) (FIGS. 14 and 15) and a point q' (point located within the same erase section together with the point q and calculated one time before the calculation of the point q) (FIGS. 14 and 15).

That is, the distance $L_1$ between two points of the point q and q' which continue in the erase section in the primitive figure obj#i is calculated in Step 73.

Then, a path $L_2$ from a point represented by Min(qt, qt') and a point represented by Max(qt, qt') along the locus of the primitive figure obj#i is calculated in Step 74.

Here, Min(x, y) or Max(x, y) respectively means that the smaller one or greater one is taken among x and y.

Accordingly, the path $L_2$ from a point (either one among the points q and q') represented by smaller one among the parameters qt and qt' which respectively represent the point q and q' to a point (either the other one among the points q and q') represented by greater one among the parameters along the locus of the primitive figure obj#i in the direction to which the parameter increases is calculated in Step 74. That is, a length (path) of the locus of the primitive figure obj#i (distance) between the points q and q' is found in Step 74.

After calculating the path $L_2$, it is discriminated whether the path $L_2$ is more than r times of the distance $L_1$ or not in Step 75 (r: a real number greater than 1 and is a value which is set by a designer of the pen computer). This r may be changed by the user of the computer.

Here, for the arbitrary points q and q' in the erase section wherein the parameter is continuous, the distance $L_1$ and path $L_2$ are almost equal.

However, when the handwritten input is made passing through the duplicated portion of the proximity area of the closed figure as described above as shown in FIG. 16b for example, there is a chance that the point q or q' becomes the point Pmin or Pmax (or Pmax or Pmin), respectively.

Since the path $L_2$ between the points q and q' (between the points Pmin and Pmax) goes along the locus of the primitive figure in this case, it is the length of the locus of the closed figure indicated by the section e1 in FIG. 16b. That is, it is the length of the whole locus of the closed figure and becomes a considerably greater value as compare to the distance $L_1$ between the points q and q' (between the points Pmin and Pmax).

Then, when the path $L_2$ is determined to be not more than r times of the distance $L_1$ in Step 75, i.e., when the path $L_2$ and the distance $L_1$ are almost equal, it is determined that the points q and q' are not such as to pass through the duplicated portion of the proximity area of the closed figure in Step 75 and the above-mentioned normal process is carried out by returning to Step 42 in FIG. 14 or to Step 67 in FIG. 15 via Step 72.

On the other hand, when the path $L_2$ is determined to be more than r times of the distance $L_1$ in Step 75, i.e., the path $L_2$ is considerably greater than the distance $L_1$, it is determined that the points q and q' are what pass through the duplicated portion of the proximity area of the closed figure and the process for dividing the erase section between the points q and q' is performed thereafter.

That is, in this case, the process advances to Step 76 to discriminate whether the special process for closed figure is what is called in Step 41 in FIG. 14. When the special process for closed figure is determined to be not what is called in Step 41 in FIG. 14 in Step 76, i.e., the special process for closed figure is what is called in Step 66 in FIG. 15, it is returned to Step 62 in FIG. 15.

As described above, in Step 62 in FIG. 15, the index k is incremented by one, the value stored in the variable st which represents the parameter candidate which corresponds to the start point is set for the parameter st(k) which corresponds to the start point of the k-th erase section, the value stored in the variable et which represents the parameter candidate which corresponds to the end point is set for the parameter et(k) which corresponds to the end point of the k-th erase section, and the identification number of the primitive figure obj#prI is set for the variable id(k) as the erase section data in the k-th erase section.

Accordingly, in this case, a section up to the point q' is defined to be one erase section and a section on and after the point q is defined to be another erase section.

That is, if the sequence of handwriting points Hc shown in FIG. 16b composes the locus inputted by a single stroke of handwriting from the left to right in the figure for example, the erase section from a point q1 to point q4 via points q2 and q3 on the closed figure is divided into two parts of an erase section E1 from the point q1 to q2 (=Pmax) and an erase section E2 from the point q3 (=Pmin) to q4 as shown in FIG. 16c.

On the other hand, when the special process for closed figure is determined to be what is called in Step 41 in FIG. 14 in Step 76, the process advances sequentially through Steps 77 and 78 to perform the same processes with those in Steps 47 and 48 in FIG. 14.

The processes in Steps 47 and 48 in FIG. 14 are, so to speak, processes for defining an erase section (k-th erase section) as seen from the content of the processing described above, so the section up to the point q' is defined to be one erase section by the similar processes in Steps 77 and 78.

After finishing the process in Step 78, the process returns to Step 39 in FIG. 14 to set the parameter qt which corresponds to the point q for the variable st or et which represents the parameter candidate which respectively corresponds to the start or end point of the erase section and thereby to calculate a new erase section by the processes thereafter. That is, the section on after the point q is defined to be another erase section.

After finishing the erase section calculating process in Step 2 (FIG. 2) as described above, the erase section data as explained in FIG. 9 is stored in the RAM 3. Accordingly, the portion of the primitive figure which overlaps with the single stroke of handwritten input may be erased by erasing the locus of the primitive figure within the range represented by st(k) through et(k) among the parameters which represent the primitive figure having the identification number of id(k) in the erase section data. However, in this case, when an erasure is to be made from (or 'to') the edge of the primitive figure or cross point of another primitive figure, a handwritten input is required from the start or end point of the erase section so as to coincide (almost) with the edge or cross point of the primitive figure to be erased in the erase section calculating process in Step 2. Then, it gives a cumbersome feeling to the user to request such high precision handwritten input.

Then, in the erase section correcting process in Step 3 (in FIG. 2), the parameters st(k) and et(k) of the erase section data obtained in the erase section calculating process in Step 2 are corrected under a certain condition to define a section to (or 'from'), so to speak, a good delimit point on the primitive figure which is considered to be requested by the user to be erased as the erase section.

That is, in the case of FIG. 8 for example, the parameters et(1) and st(2) which respectively represent the end point of the erase section K1 in the primitive figure obj1 and the start point of the erase section K2 in the primitive figure obj2 which are located near a cross-point of the primitive figures obj1 and obj2 are corrected so as to represent the cross-point in Step 3.

Figure 19:
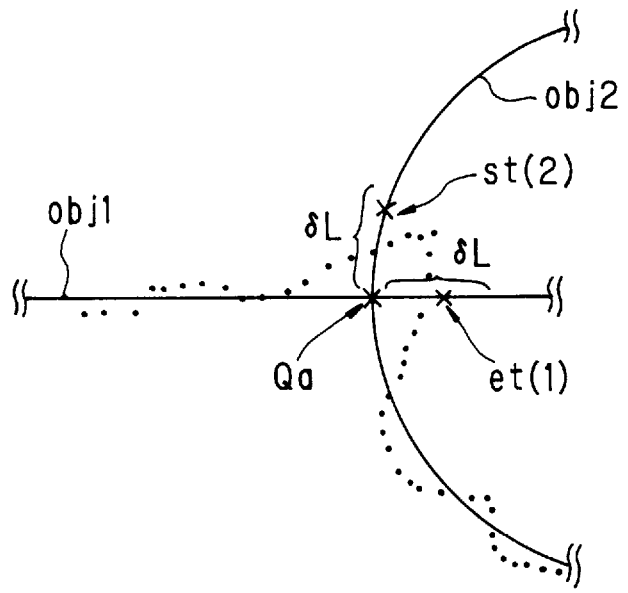
FIG. 19 is a drawing depicting a process in Step S3 in FIG. 2.

More specifically, as shown in FIG. 19 which depicts an enlarged nearby area of the cross-point (cross-point on the side of the section K1) of the primitive figures obj1 and obj2 in FIG. 8, all of start and end points of the erase section within a path δL along the loci of the primitive figures obj1 and obj2 from the cross point Qa of the primitive figures obj1 and obj2, i.e., points represented respectively by the parameter et(1) and st(2), are detected and the parameters et(1) and st(2) are corrected so as to represent the cross-point Qa.

Figure 20:
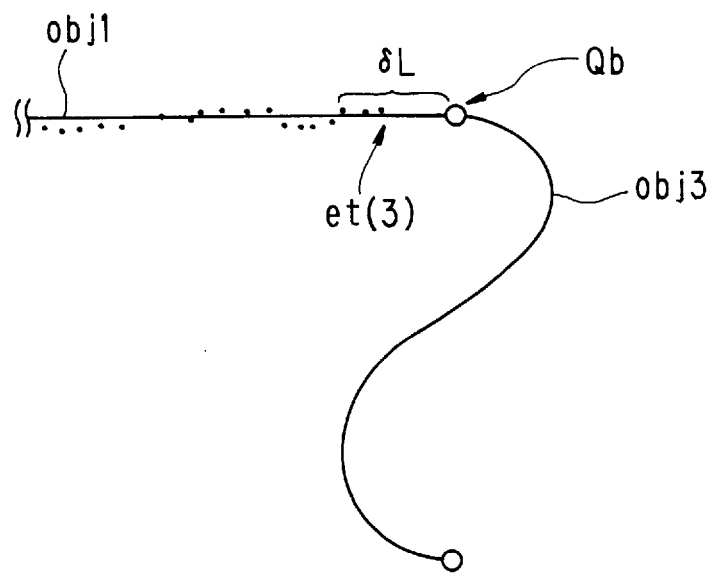
FIG. 20 is a drawing depicting Step S3 in FIG. 2.

Further, as shown in FIG. 20 which depicts an enlarged nearby area of the cross-point of the primitive figures obj1 and obj3 in FIG. 8, all of start and end points of the erase section within a path δL, i.e., the points represented by the parameter et(3), are detected along the loci of the primitive figure obj1 and obj3 from an edge point Qb of the primitive figure obj1 (this point Qb is also the edge of the primitive figure obj1, the edge of the primitive figure obj3 and a cross-point of the primitive figures obj1 and obj3) and the parameter et(3) is corrected so as to represent the edge point (cross-point) Qb.

Figure 21:
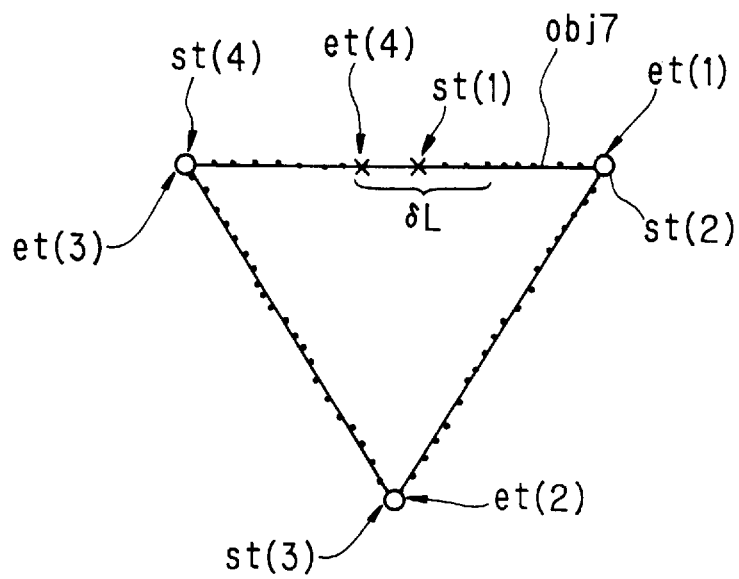
FIG. 21 is a drawing depicting Step S3 in FIG. 2.

When a triangle composed of three primitive figures including a primitive figure obj7 is displayed on the display 5 (FIG. 1) as shown in FIG. 21, for example, and when the single stroke of handwritten input composed of a sequence of handwriting points shown by the black dots in the figure is made, either a parameter et(4) or st(1) which express the primitive figure obj7 is corrected so as to become equal to a value of the other one when a path between two points represented by the parameters et(4) and st(1) along the locus of the primitive figure obj7 is smaller than δL in Step 3.

Although δL described above may be a fixed value or be set by the user, it is set corresponding to a length of the locus of a primitive figure composed of points represented by a parameter which is to be corrected in accordance with the present embodiment.

Figure 22:
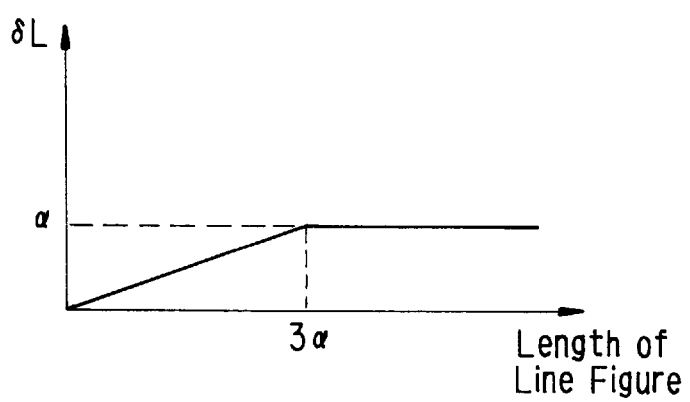
FIG. 22 is a graph depicting a method for calculating $\delta L$ in FIGS. 19 through 21.

That is, as shown in FIG. 22 for example, when a length of locus of a primitive figure is smaller than $3\alpha$, δL is set at a value proportional to the locus length. When the locus length of the primitive figure is equal to or greater than $3\alpha$, i.e., the locus length of the primitive figure is more than $3\alpha$, δL is set at $\alpha$. It should be noted that $\alpha$ may be set with respect to the resolution of the display 5 or of tablet 8 for example.

When a handwritten input for erasing a portion of a short primitive figure is made, it becomes possible to prevent the whole primitive figure from being erased owing to the above-mentioned correction possible by setting δL as described above.

Figure 23:
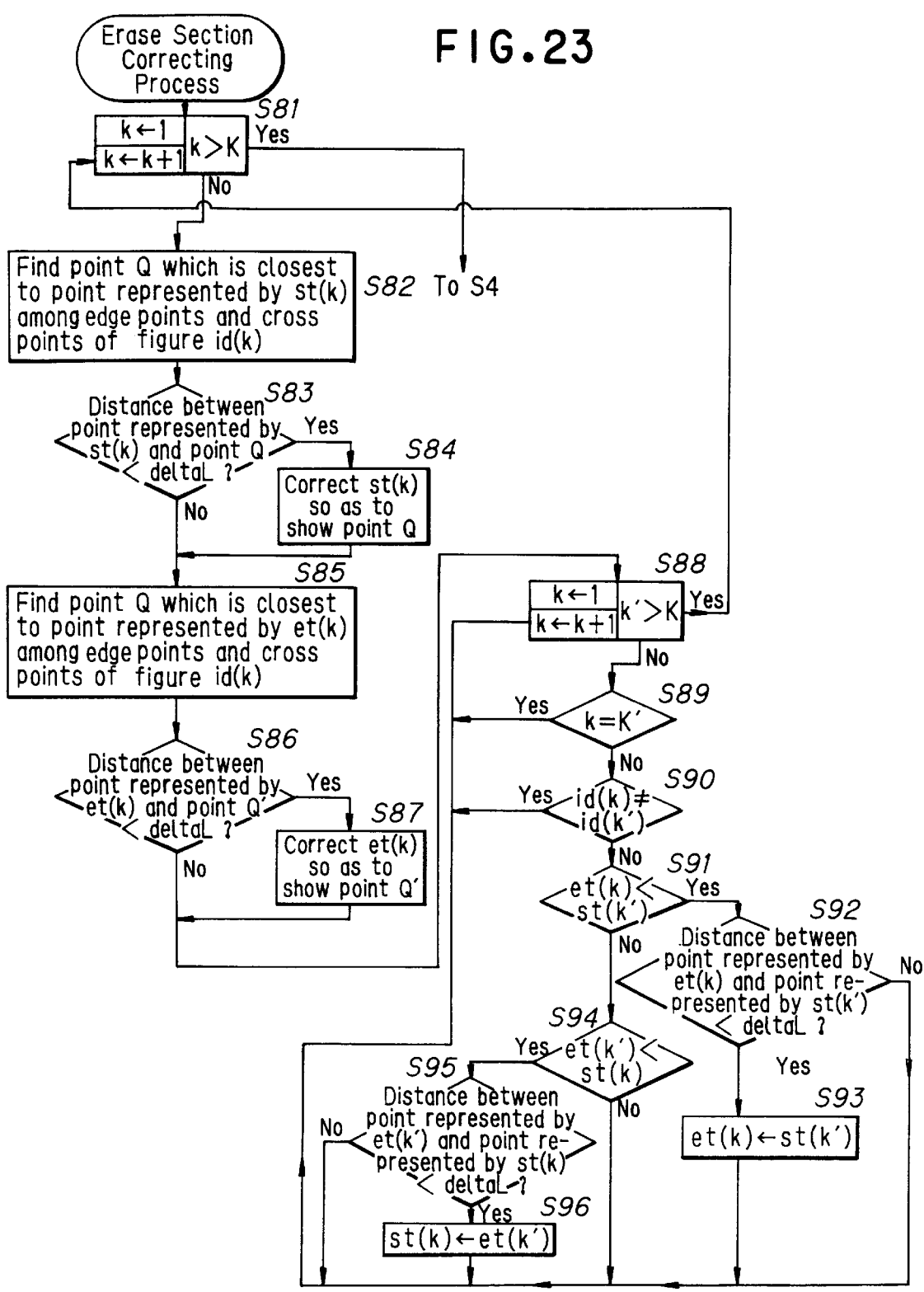
FIG. 23 is a flowchart depicting the process in Step S3 in FIG. 2 in detail.

Next, the erase section correcting process in Step 3 (FIG. 2) will be explained in detail with reference to a flowchart in FIG. 23. In the erase section correcting process, a loop control in and after Step 82 is performed by substituting 1 through K for the index k in the erase section data (FIG. 9) stored in the RAM 3 in Step 81 at first. K is a total number of erase section data stored in the RAM 3.

Under the loop control of Step 81, a point Q which is closest to a point represented by a parameter st(k) stored as the erase section data is calculated among edge and cross points on a primitive figure having an identification number id(k) in Step 82. Then, in Step 83, it is discriminated whether a path from the point represented by the parameter st(k) to the point Q along a locus of the primitive figure having the identification number id(k) is smaller than δL or not.

When the path from the point represented by the parameter st(k) to the point Q is determined to be smaller than δL in Step 83, the process advances to Step 84 to correct the value of the parameter st(k) so that it represents the point Q. The process then advances to Step 85.

When the path from the point represented by the parameter st(k) to the point Q is determined to be not smaller than δL in Step 83, the process advances to Step 85, by skipping Step 84, to calculate a point Q' which is closest to a point represented by a parameter et(k) stored as the erase section data among the edge and cross points of the primitive figure having the identification number id(k).

In Step 86, it is discriminated whether a path from the point represented by the parameter et(k) to the point Q' along the locus of the primitive figure having the identification number id(k) is smaller than δL or not.

When the path from the point represented by the parameter et(k) to the point Q', is determined to be smaller than δL in Step 86, the process advances to Step 87 to correct the value of the parameter et(k) so that it represents the point Q'. The process then advances to Step 85.

The correction explained with reference to FIGS. 19 and 20 is thus made by the processes in Steps 82 through 87. When there is neither cross point nor edge points on the primitive figure having the identification number id(k), the process advances to Step 88 by skipping Steps 82 through 87.

When the path from the point represented by the parameter et(k) to the point Q' is determined to be not smaller than δL in Step 86, the process advances to Step 88 by skipping Step 87 to perform a loop control in and after Step 89 by substituting 1 through K for a parameter k'. k' is an index of the erase section data stored in the RAM 3 similar to k.

Under the loop control of Step 88, it is discriminated whether the variables k and k' are equal or not in Step 89. When the variables k and k' are determined to be equal in Step 89, the process returns to Step 88 to repeat the processes in and after Step 89 under the loop control of Step 88.

When the variables k and k, are determined to be not equal in Step 89, the process advances to Step 90 to discriminate whether the identification numbers of the primitive figure id(k) and id(k') are equal or not. When the identification numbers id(k) and id(k') are determined to be not equal in Step 90, the process returns to Step 88.

On the other hand, when the identification numbers id(k) and id(k') are determined to be equal in Step 90, the process advances to Step 91 to make a correction in Steps 91 through 96 as explained with reference to FIG. 21.

That is, the correction explained in FIG. 21 is carried out when there are different erase sections (a plurality of erase sections) in one primitive figure.

In Step 91, it is discriminated at first whether a parameter et(k) representing an end point of a k-th erase section of one primitive figure is smaller than a parameter st(k') representing a start point of a k'-th erase section of that primitive figure or not. When the parameter et(k) is determined to be smaller than the parameter st(k') in Step 91, the process advances to Step 92 to discriminate whether a path between two points represented by the parameters et (k) and st(k') along the primitive figure is smaller than δL or not.

When the path between the points et(k) and st(k') is determined to be smaller than δL in Step 92, the process advances to Step 93 to cause a value of the parameter et(k) to coincide with a value of the parameter st(k'). The process then returns to Step 88.

Figure 24A:
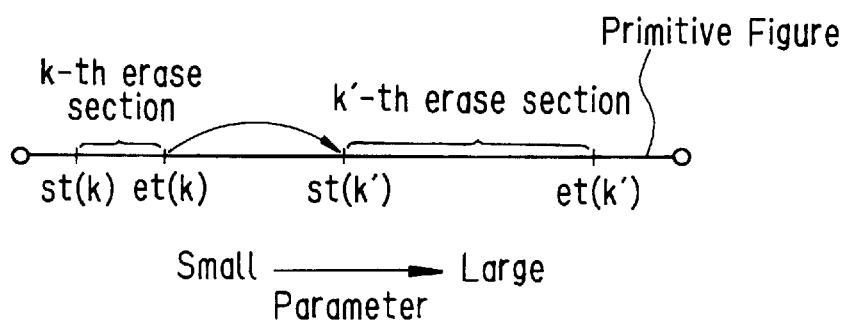
FIGS. 24a and 24b are drawings depicting processes in Steps S91 through S96 in FIG. 23.

Accordingly, when there are k-th and k'-th erase sections having a positional relationship as shown in FIG. 24a for example and when the path between two points represented respectively by the parameters et (k) and st(k') is smaller than δL, the correction is made so that the parameter et(k) coincides with the parameter st(k').

When the path between the points et(k) and st(k') is determined to be not smaller than δL in Step 92, the process returns to Step 88, skipping Step 93.

On the other hand, when the parameter et(k) is determined to be not smaller than the parameter st(k') in Step 91, the process advances to Step 94 to discriminate whether the parameter et(k') is smaller than the parameter st(k) or not. When the parameter et(k1) is determined to be not smaller than the parameter st(k) in Step 94, the process returns to Step 88, skipping Steps 95 and 96.

When the parameter et(k') is determined to be smaller than the parameter st(k) in Step 94, the process advances to Step 95 to discriminate whether the path between two points represented by the parameters et(k') and st(k) along the primitive figure is smaller than δL or not.

When the path between the points et(k') and st(k) is determined to be smaller than δL in Step 95, the process advances to Step 96 to cause a value of the parameter st(k) to coincide with a value of the parameter et(k'). The process then returns to Step 88.

Figure 24B:
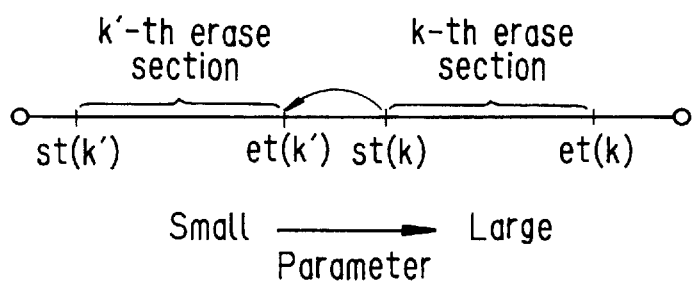

Accordingly, when there are k-th and k'-th erase sections having a positional relationship as shown in FIG. 24b for example and when the path between two points represented respectively by the parameters et(k') and st(k) is smaller than δL, a correction is made so that the parameter st(k) coincides with the parameter et(k').

When the path between the points et(k') and st(k) is determined to be not smaller than δL in Step 95, the process returns to Step 88, skipping Step 96.

Then, when the incremented variable k' is determined to be greater than K in Step 88, the process returns to Step 81 to repeat the processes in and after Step 82 under the loop control of Step 81 until the incremented variable k is determined to be greater than K.

When the incremented variable k is determined to be greater than K in Step 81, the erase section correcting process is finished and the process advances to Step 4 in FIG. 2.

Because the erase section correcting process described above allows to erase up to a good delimit point of the primitive figure in the succeeding Step 4, i.e., because it allows to erase in accordance to an intention of the user even if a handwritten input is made roughly more or less, an operability of the device may be improved.

After finishing the erase section correcting process in Step 3, the process advances to Step 4 in FIG. 2 to make reference to the erase section graphic data stored in the erase section graphic data region 3c in the RAM 3 and to erase a locus of a primitive figure between two points (between start and end points of an erase section) represented by parameters.

Figure 25:
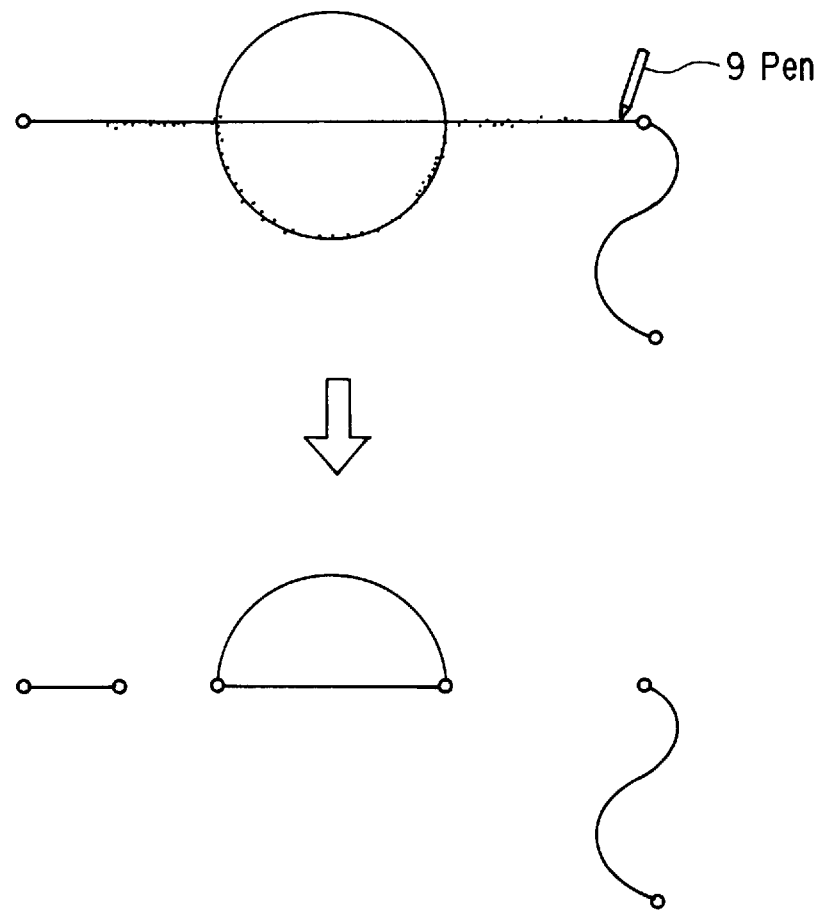
FIG. 25 is a drawing illustrating a result of the erasing process in Step S4 in FIG. 2.

That is, it allows to obtain an erasure result as shown in FIG. 25 when the single stroke of handwritten input shown in FIG. 4 has been made for example.

As described above, the pen computer in FIG. 1 requires no manipulation of the pen 9 for changing its function in erasing a section, i.e., the erasure may be done just by a single stroke of handwritten input, and hence it allows to erase readily in the middle of graphic input work.

Furthermore, because the discrimination for discriminating whether a handwritten input is what specifies an erasure or not, requires no complicated matching process and requires only a measurement of, so to speak, a positional displacement between the handwritten input and the primitive figure, the apparatus may be realized with low cost computing resources.

That is, the very primitive figures managed by the graphic editor correspond to the dictionary in the conventional apparatus in which an erasure is determined by gesture, so that no matching process carried out in the conventional apparatus needs to be carried out. That is, only a shape of the concrete primitive figure needs to be compared with the locus of handwritten input, i.e., the apparatus of the present invention requires only the simple process, thus allowing to reduce its cost.

Furthermore, because the very locus of the handwritten input for specifying an erasure represents the very object to be erased, even a partial erasure of a complex primitive figure for example may be readily performed.

Still more, because the apparatus of the present invention is adapted to be able to correct a section to be erased, an infallible erasure can be made even if a handwritten input is made more or less roughly.

Furthermore, because the apparatus of the present invention requires, when erasing a section across a plurality of primitive figures, the manipulation for grouping them as in the past, it prevents a cumbersome sensation being imparted to the user.

While the present invention has been explained for the case when it is applied to the pen computer, the present invention may be applied to all kinds of handwriting input apparatus.

Although the handwritten input has been made by the pen 9 in the present embodiment, a mouse or joy-stick may be provided for example instead of the pen 9.

Further, although figures have been the object of the processing in the explanation above, the present invention may be applied to character strings (character strings in the wide sense which include numerals and symbols), beside figures. In this case, however, a position of each character composing the character string is represented by the parameter.

Still more, when d which is the argument of the function f(i, d) which represents the predetermined distance D for defining the proximity area described above is set at a fixed value, the distance D may be set as follows for example.

Figure 26A:
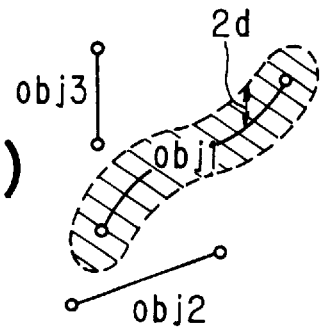
FIGS. 26a through 26c are drawings depicting a method for calculating a distance D in correspondence to a positional relationship with a plurality of primitive figures.

That is, when there are primitive figures obj1 through obj3 as shown in FIG. 26a, and when a distance D defining a proximity area of the primitive figure obj1 among those is to be set for example, the distance D may be set as D=d when there is no other primitive figures (the primitive figures obj2 and obj3 in this case) in a range (hatched portion in the figure) of distance of fixed value 2d for example.

Figure 26B:
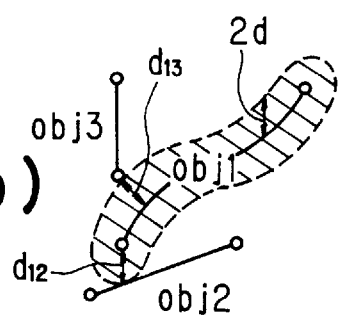

Furthermore, when there is the other primitive figure (the primitive figure obj2 or obj3 in this case) within the range (hatched portion in the figure) of distance of the fixed value 2d for example from the primitive figure obj1 as shown in FIG. 26b, the distance D is set as D=$d_{1x}$/2 (where, $d_{1x}$ is the shortest distance between the primitive figure obj1 and the primitive figure obj#x which is closest to that).

Figure 26C:
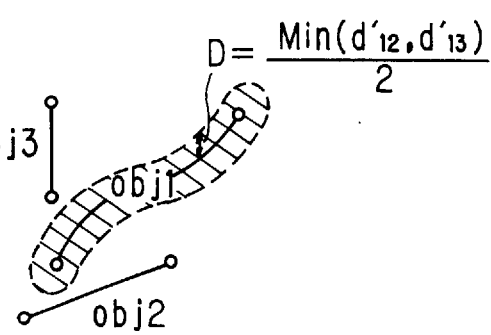

Accordingly, if the shortest distance between the primitive figure obj1 and the primitive figure obj2 or obj3 is assumed to be $d'_{12}$ or $d'_{13}$ and when the primitive figures obj2 and obj3 exist within the range of distance of 2d from the primitive figure obj1, the proximity area of the primitive figure obj1 becomes a range (hatched portion in the figure) of distance of D=Min($d'_{12}$, $d'_{13}$)/2 as shown in FIG. 26c.

From above, in the case shown in FIG. 26, the distance D for defining the proximity area of the primitive figure obj#i is set in accordance to the following expression:

$$D = f(i, d) = \mathrm{Min}(d_{1x}/2, d)$$

Figure 27A:
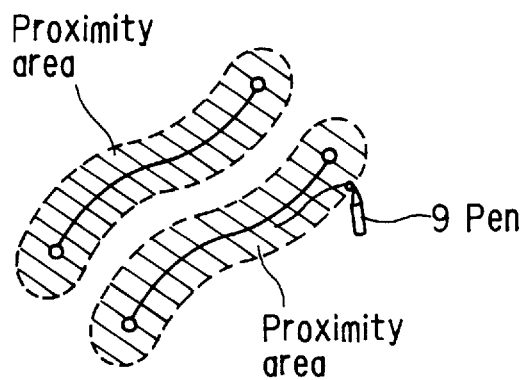
FIGS. 27a and 27b are drawings illustrating processing results obtained by using the distance D calculated by the method shown in FIG. 26.
Figure 27B:
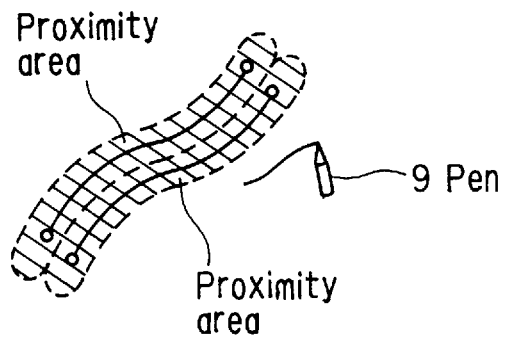

In this case, when a plurality of primitive figures are approximately parallel and are displayed sporadically as shown in FIG. 27a, proximity areas (hatched portions in the figure) become large and the primitive figures may be erased even if a rough handwritten input is made. Further, when a plurality of primitive figures which approximately run in parallel are displayed densely as shown in FIG. 27b, proximity areas (hatched portions in the figure) become smaller and a new figure (e.g., specially a parallel line) may be readily input near them.

Although the function f for representing the predetermined distance D for defining the proximity area is defined to be f(i, d) and the index i of the primitive figure is used as its argument together with d in the present embodiment as described in FIG. 7, the index j of the sequence of handwriting points p(j) may be used as the argument of the function f, instead of the index i of the primitive figure. That is, the distance D may be found in accordance to an expression D=f(j, d).

Figure 28:
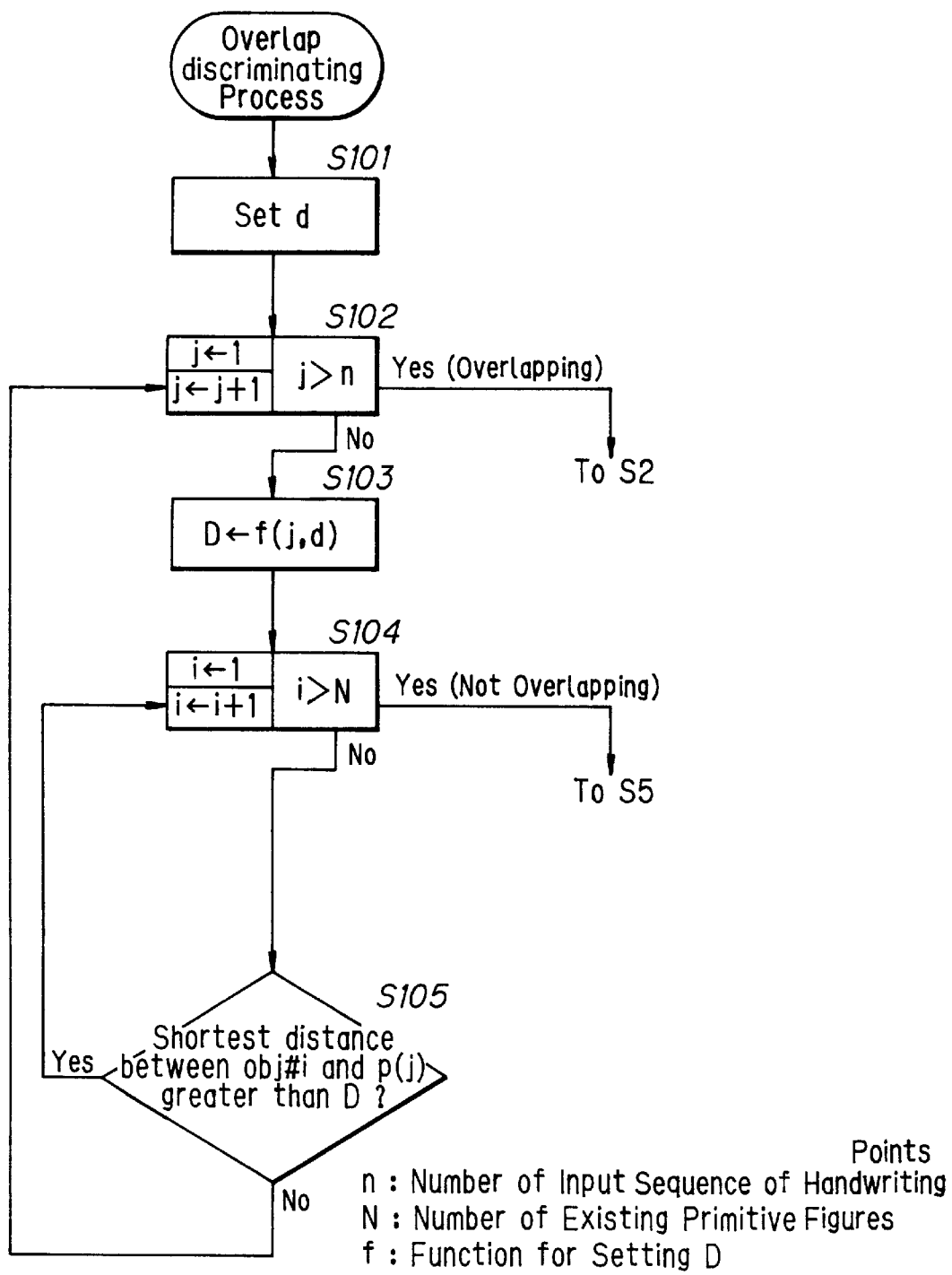
FIG. 28 is a flowchart depicting the process in Step S1 in FIG. 2 in detail.

In this case, the overlap discriminating process in Step 1 in FIG. 1 is performed in accordance with a flowchart shown in FIG. 28, and not the flowchart shown in FIG. 7. Steps 101 through 103 or 105 are process steps for performing the same processes in Steps 11 through 13 or 15 in FIG. 7. In Step 103 in FIG. 28, a value given by the function f(j, d) is set as the predetermined distance D. Accordingly, in the flowchart shown in FIG. 28, the process in Step 104 which corresponds to the process for calculating the distance D in Step 14 which is provided between Steps 13 and 15 is provided between Steps 102 and 103 which respectively correspond to Steps 12 and 13 in FIG. 7 and the same processes with those explained in FIG. 7 are performed.

Figure 29A:
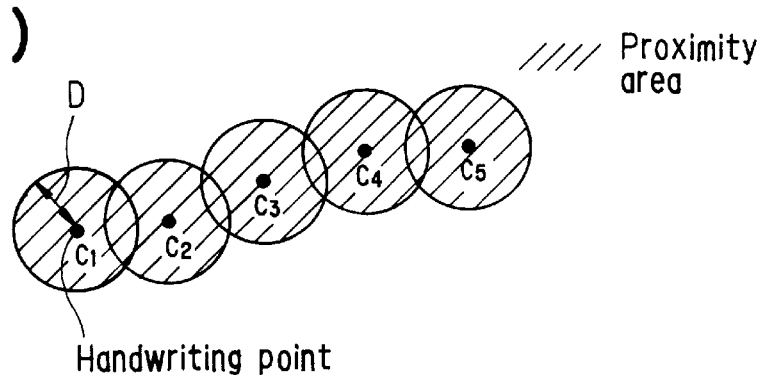
FIGS. 29a and 29b are drawings depicting a proximity area (proximity areas) of a handwriting point.

When the overlap discriminating process in Step 1 in FIG. 2 is performed in accordance to the flowchart shown in FIG. 28, the range of the predetermined distance D from the primitive figure is not defined as the proximity area, but ranges (hatched portions in the figure) of the predetermined distance D from each of a sequence of handwriting points composing a locus of a handwritten input are defined to be proximity areas $C_1, C_2, C_3, C_4, C_5, C_1, \ldots$ as shown in FIG. 29a.

Figure 29B:
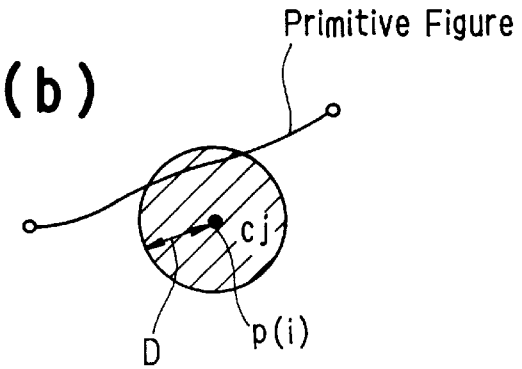

Thereby, according to the flowchart in FIG. 28, when there is any one of a number primitive figures currently displayed on the display 5 within a proximity area $c_j$ of a handwriting point p(j) as shown in FIG. 29b, i.e. when a shortest distance between the handwriting point p(j) and any one of the primitive figures is less than the distance D, the handwriting point p(j) is determined to be overlapping with the primitive figure in Step 105 and the process advances to Step 102 leaving the loop composed of Steps 103 and 105. Accordingly, when all of the sequence of handwriting points of a single stroke of handwritten input overlap with the primitive figure, the CPU 1 recognizes that an erasure has been specified and the process advances to the erase section calculating section in Step 2 in FIG. 2.

Similarly to the case in FIG. 7, this case also requires no complicated matching process in discriminating whether a handwritten input is what specifying an erasure nor not. It requires only the simple process for comparing a shape of a primitive figure with a locus of handwritten input and allows to reduce the cost of the apparatus.

Furthermore, in this case, the distance D calculated from the above-mentioned expression (D=f(i, d)) may be one which corresponds to a stroke speed of the pen 9 (handwritten input speed of the pen 9) at the handwriting point p(j) when a handwritten input is made.

That is, the value of the distance D may be smaller for handwriting points having slow stroke speed and be larger for handwriting points having fast stroke speed in proportional to the stroke speed of the pen 9.

In this case, the stroke speed of the pen 9 $S_j$ at the handwriting point p(j) is defined by the following expression for example:

$$S_j = Dis(p(j-1), p(i))/T_{j-1,j}$$

where, Dis(p(j-1), p(j)) is a distance between the handwriting points p(j-1) and p(j) and $T_{j-1,j}$ is a time until the handwriting point p(j) is input since the handwriting point p(j-1) has been input. When j=1, $S_1$ shall be $S_1=S_2$.

Accordingly, in this case, the distance D is given by the following expression for example (FIG. 30b):

$$\begin{aligned} D &= f(j, d) \\ &= \beta S_j + d \end{aligned}$$

where, $\beta$ is a predetermined constant of proportion. In FIG. 30b, Dis(p(j-1), p(j)) is shown by adding a bar (-) on $p_{j-1}p_j$.

The distance D which corresponds to the stroke speed $S_j$ may be given by other expressions such as an expression in which the distance is proportional to a square of the stroke speed $S_j$ at the handwriting point p(j), beside the above-mentioned expression.

Figure 30A:
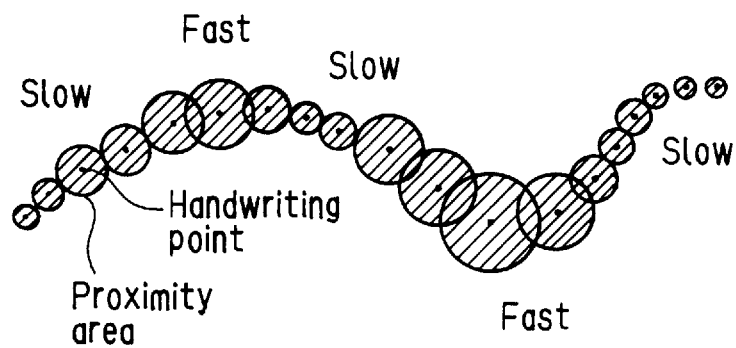
FIGS. 30a and 30b are drawings depicting a method for calculating a distance D for determining a proximity area of a handwriting point in correspondence to a handwritten input speed.
Figure 30B:
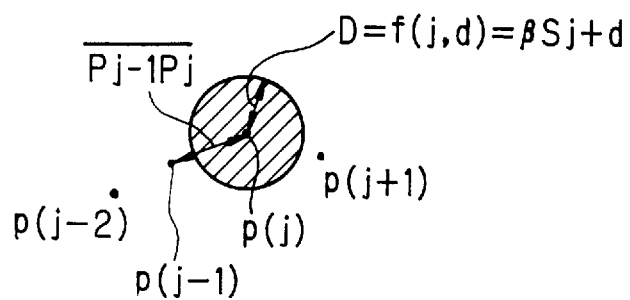

When the distance D is calculated following the above expression, the proximity areas become small at the handwriting points where the stroke speed of the pen 9 is slow and become large at the handwriting points where the stroke speed is fast (FIG. 30a).

Then, it is presumed that, in erasing the primitive figures, a user of the pen computer according to this embodiment, will quickly manipulate the pen 9 when the primitive figures are sporadically displayed and carefully manipulate the pen 9 when the primitive figures are densely displayed.

Accordingly, because the erasing process can be performed based on the manipulation of the pen 9 which reflects the intent of the user, the operability of the apparatus may be improved.

Furthermore, the distance D may be calculated based on the stroke speed of the pen 9 when the stroke of handwritten input is made, even when the distance D is calculated using the function f(i, d) in which the index i of the primitive figure obj#i is included as the argument or when it is calculated from the function f(j, d) in which the index j of the handwriting point p(j) is included as the argument, i.e., when the process in Step 1 in FIG. 1 is performed in accordance to the flowchart in FIG. 7 or to the flowchart in FIG. 28, as follows.

That is, in this case, the distance D may be calculated based on an average value of the stroke speed of the pen 9 for example.

Figure 31:
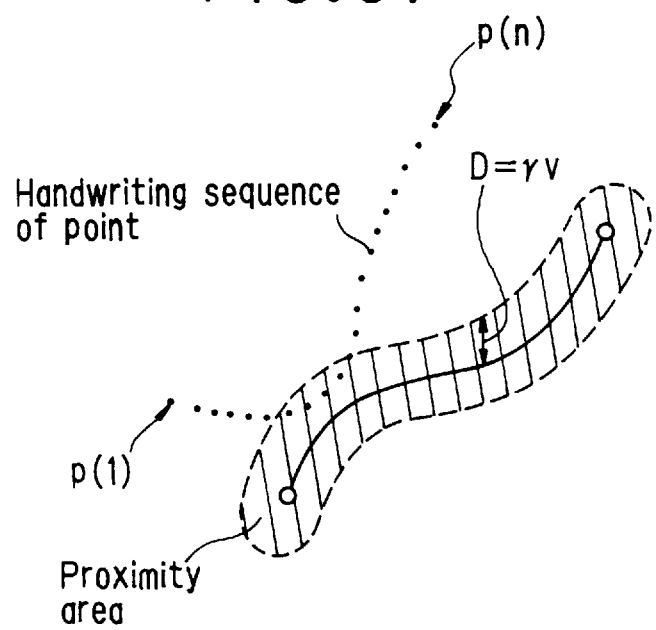
FIG. 31 is a drawing depicting a method for calculating a distance D for determining a proximity area of a primitive figure in correspondence to a handwritten input speed.

More specifically, when there is a single stroke of handwritten input composed of a sequence of handwriting points p(1) through p(n) as shown in FIG. 31 for example, an average stroke speed v of the pen 9 when the single stroke of handwritten input is made, is determined using the following expression for example:

$$v = \text{sigma } Dis(p(j-1), p(j))/T$$

where sigma denotes a summation by substituting 2 through n (n: total number of handwriting points) for j and T is a time which takes for the single stroke of handwritten input (time until when the handwriting point p(n) is input since the handwriting point p(1) has been input).

Then, the distance D is calculated following the next expression for example:

$$D = \gamma v$$

where T is a predetermined constant of proportion.

From above, in this case, the distance D may be derived using the following expression:

$$\begin{aligned} D &= f(i, d) \\ &= f(j, d) \\ &= d \\ &= \gamma v \end{aligned}$$

When the distance D is calculated as described above, a primitive figure may be erased by quickly manipulating the pen 9 even when a handwritten input is made at a position separated more or less from the primitive figure to be erased as shown in FIG. 32a and a new primitive figure may be input without erasing a primitive figure by carefully (slowly) manipulating the pen 9 even when a handwritten input is made near the primitive figure as shown in FIG. 32b.

Although FIGS. 31 and 32 show the state wherein the proximity area is defined as an area within the range of the predetermined distance D from the primitive figure, the proximity area may be considered as an area within the range of the predetermined distance D from each of the sequence of handwriting points when the distance D is defined as $D=\gamma v$.

Figure 33:
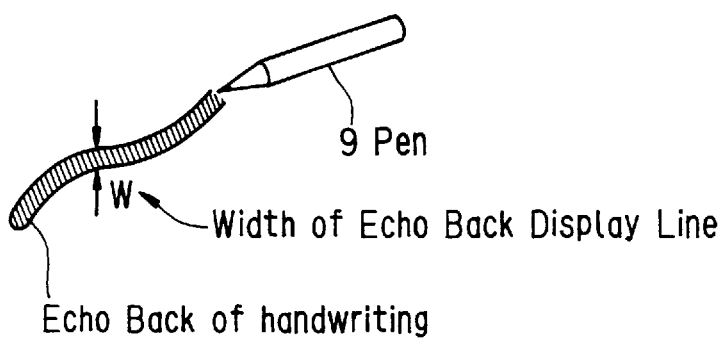
FIG. 33 is a drawing for explaining a method for calculating the distance D in correspondence to a width W of a line displayed on a display 5.

Furthermore, the distance D may be calculated corresponding to a width W of a locus of a handwritten input echoed back and displayed on the display 5 or of a primitive figure displayed on the display 5 as shown in FIG. 33 for example even when the process in Step 1 is performed in accordance to the flowchart in FIG. 7 or to the flowchart in FIG. 28.

That is, the distance D may be calculated by the following expressions for example:

$$\begin{aligned} D &= f(i, d) \\ &= f(j, d) \\ &= d \\ &= \epsilon W \end{aligned}$$

where $\epsilon$ is a predetermined constant of proportion.

In this case, because the thicker the width W of the locus, the larger the proximity area becomes and generally the user receives an impression that the proximity area is large when the width W of the locus is thick, an operability which conforms to the sense of the user may be provided.

The distance D which corresponds to the width W may be given with other expressions, beside the above-mentioned expression, such as an expression in which the distance is proportional to a square of the width W. In this case, the proximity area may be considered as the area within the range of the predetermined distance D from the primitive figure or the area within the range of the predetermined distance D from each of the sequence of handwriting points.

Figure 34:
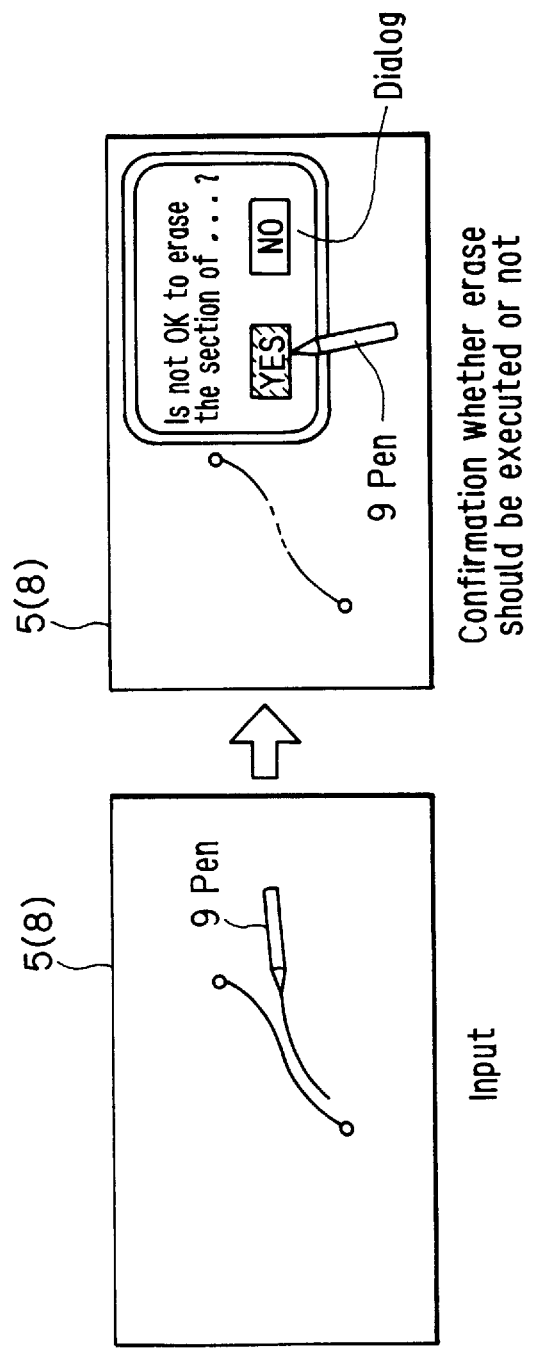
FIG. 34 is a drawing showing a state in which a message for confirming whether an erasure can be made or not is displayed on the display 5.
Figure 35:
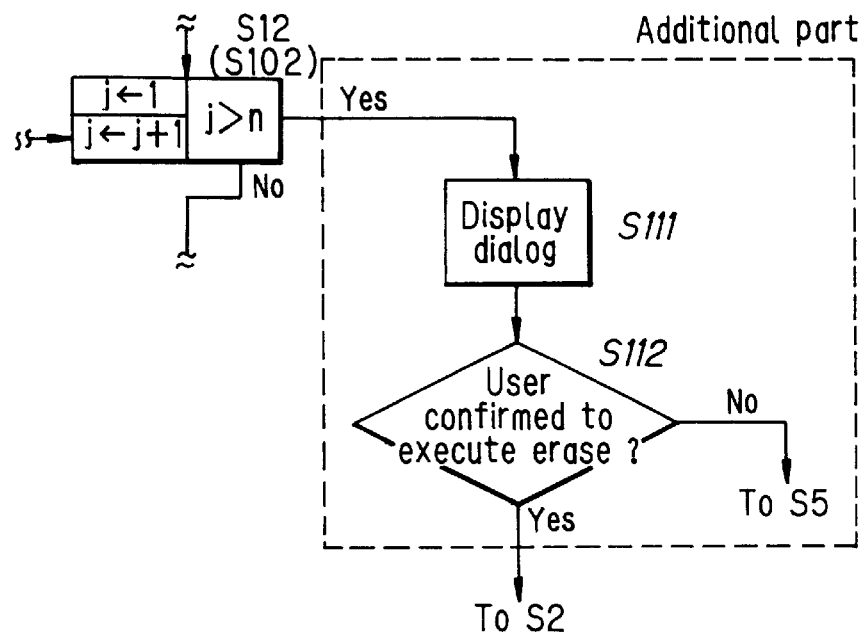
FIG. 35 is a flowchart for explaining a process added when the message for confirming whether an erasure can be made or not is displayed on the display 5.
Figure 36:
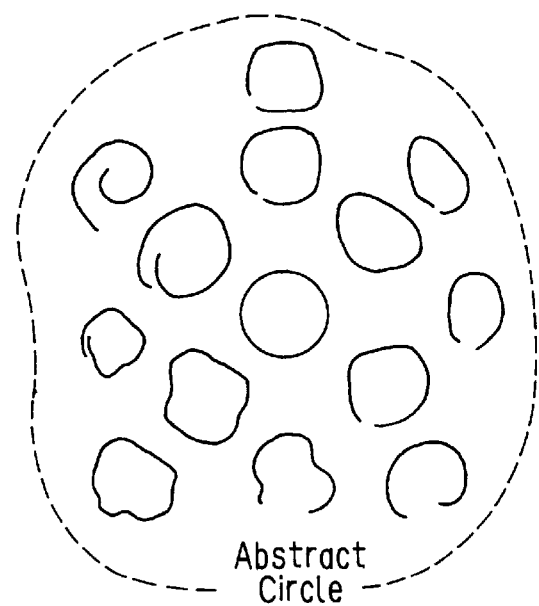
FIG. 36 is a drawing for explaining a description about a circle registered in a dictionary of a conventional pen computer.
Figure 37A:
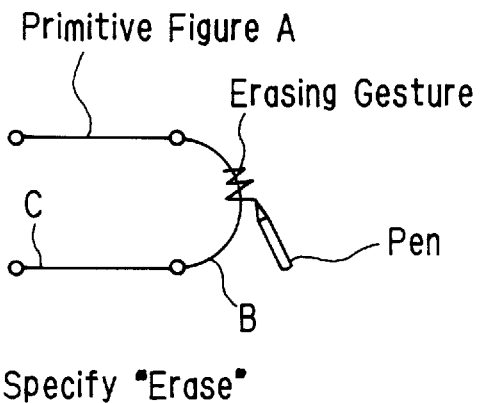
FIGS. 37a through 37c are drawings for explaining an erasing operation in the conventional pen computer.
Figure 37B:
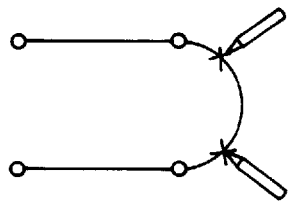
Figure 37C:
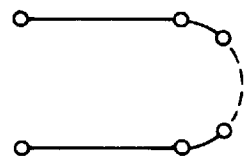
Figure 38A:
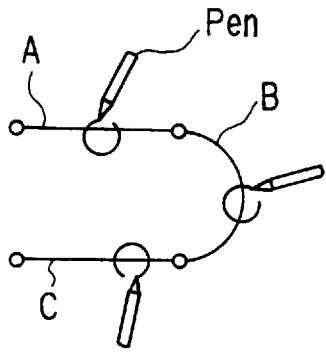
FIGS. 38a through 38d are drawings for explaining an erasing operation in the conventional pen computer.
Figure 38B:
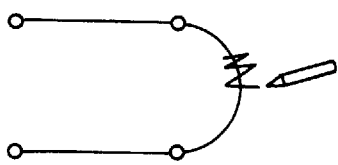
Figure 38C:
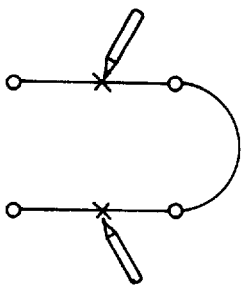
Figure 38D:
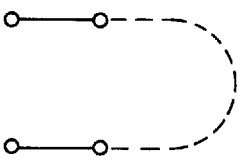

Furthermore, although the overlap portion is erased in Step 4 via Steps 2 and 3 when the whole locus of the single stroke of handwritten input is determined to be overlapping with the primitive figure in Step 1 in the present embodiment, it is also possible to cause the display 5 to display a dialogue in which a message for confirming whether an erasure may be made or not is displayed and to erase only when YES button in the dialogue is manipulated by the pen 9 as shown in FIG. 34 for example.

This may be performed by adding processes in Step 111 and 112 in FIG. 32 after leaving the loop control in Step 12 in FIG. 7 or in Step 102 in FIG. 28 as shown in FIG. 32 for example.

In this case, the dialogue as shown in FIG. 34 is displayed on the display 5 in Step 111 and it is discriminated whether the user has confirmed the erasure, i.e., whether YES button or NO button in the dialogue has been manipulated by the pen 9, in Step 112.

When it is determined that YES button in the dialogue has been manipulated in Step 112, the process advances sequentially to Steps 2 through 4 to erase as described above.

When it is determined that NO button in the dialogue has been manipulated in Step 112, the process advances to Step 5 to perform the graphic input process. That is, in this case, the handwritten input is considered to be the input of new figure.

By using the above confirmation technique, an erroneous erasure made by an erroneous handwritten input can be prevented from taking place.

Furthermore, the erase section correcting process in Step 3 in FIG. 2 may be applied to a case when an erase section calculated by other method than that described above is corrected. Still more, this erase section correcting process may be applied to an erase range having an area such as a square, beside the erase range (erase section) on a line which is given by start and end points.

Further, although the primitive figure has been represented by the parameters in the present embodiment, the primitive figure may be represented by other method.

As described above, the handwriting input apparatus of the present invention allows to erase a figure or character string by the simple manipulation since it is erased based on an overlap state of a locus of the single stroke of handwritten input inputted by input means with the figure or character string displayed on display means. Furthermore, since the present invention requires no shape recognition process to be performed on the locus input from the input means in erasing a figure, it allows to downsized the apparatus and to lower the cost.

Still more, the handwriting input apparatus of the present invention allows to erase a desired range even if the erase range s specified roughly more or less because the erase range specified by the input means is properly corrected.

While only a limited number of embodiments have been described, variations thereto will occur to those skilled in the art within the scope of the present inventive concepts which are delineated by the following claims.

What is claimed is:

1. A handwriting input apparatus for processing handwritten input, comprising:

input means for making a handwritten input;

a processor for processing said handwritten input, said processor representing said handwritten input using one or more of three primitive figures, said three primitive figures being a circle, a straight line segment, and a curving line segment;

display means, associated with said input means, for displaying said one or more primitive figures indicative of said handwritten input; and discriminating means for defining a proximity area around each primitive figure displayed by said display means and for discriminating whether a predetermined amount of a subsequent handwritten input is within the proximity area of one or more displayed primitive figures;

wherein said one or more displayed primitive figures having a proximity area in which a predetermined amount of said subsequent handwritten input is made, as determined by said discriminating means, is entirely erased.

2. The handwriting input apparatus according to claim 1, wherein said discriminating means defines said proximity area as an area within a predetermined distance along a line perpendicular to each point on said primitive figure displayed on said display means.

3. The handwriting input apparatus according to claim 2, wherein said predetermined distance is set at a smaller value when adjacent primitive figures are displayed within a second predetermined distance of each other and said predetermined distance is set at a larger value when adjacent primitive figures are not displayed within a third predetermined distance of each other.

4. The handwriting input apparatus according to claim 2, wherein said predetermined distance is set in correspondence to a handwritten input speed of said input means at each point.

5. The handwriting input apparatus according to claim 2, wherein said predetermined distance is set at a value proportional to an average speed of said input means when said handwritten input is made.

6. The handwriting input apparatus according to claim 2, wherein said predetermined distance is set in correspondence to a display attribute value of said handwritten input displayed on said display means.

7. The handwriting input apparatus according to claim 6, wherein the display attribute value of said handwritten input displayed on said display means is the value of a displayed width of said handwritten input.

8. The handwriting input apparatus according to claim 2, wherein said predetermined distance is set at an input value input to said discriminating means by a user.

9. The handwriting input apparatus according to claim 1, further comprising confirmation means for confirming, before a primitive figure is erased, that the primitive figure having a proximity area in which a predetermined amount of said subsequent handwritten input is made should be erased.

10. The handwriting input apparatus according to claim 1, wherein said primitive figure is represented by said processor with parameters.

11. A handwriting input method for processing handwritten input, comprising:

making a handwritten input using input means;

processing said handwritten input with a processor, said processor representing said handwritten input using one or more of three primitive figures, said three primitive figures being a circle, a straight line segment, and a curving line segment;

displaying said one or more primitive figures indicative of said handwritten input with display means, associated with said input means;

defining a proximity area around each primitive figure displayed by said display means;

discriminating with discriminating means whether a predetermined amount of a subsequent handwritten input is within the proximity area of one or more displayed primitive figures; and erasing entirely said one or more displayed primitive figures having a proximity area in which a predetermined amount of said subsequent handwritten input is made.

12. The handwriting input method according to claim 11, wherein said defining a proximity area is performed by defining an area within a predetermined distance along a line perpendicular to each point on said primitive figure displayed on said display means.

13. The handwriting input method according to claim 12, wherein said predetermined distance is set at a smaller value when adjacent primitive figures are displayed within a second predetermined distance of each other and said predetermined distance is set at a larger value when adjacent primitive figures are not displayed within a third predetermined distance of each other.

14. The handwriting input method according to claim 12, further comprising setting said predetermined distance in correspondence to a handwritten input speed of said input means at each point.

15. The handwriting input method according to claim 12, further comprising setting said predetermined distance at a value proportional to an average speed of said input means when said handwritten input is made.

16. The handwriting input method according to claim 12, further comprising setting said predetermined distance in correspondence to a display attribute value of said handwritten input displayed on said display means.

17. The handwriting input method according to claim 16, wherein the display attribute value of said handwritten input displayed on said display means is the value of a displayed width of said handwritten input.

18. The handwriting input method according to claim 12, further comprising setting said predetermined distance as an input value input by a user.

19. The handwriting input method according to claim 11, further comprising confirming with confirming means, before a primitive figure is erased, that the primitive figure having a proximity area in which a predetermined amount of said subsequent handwritten input is made should be erased.

20. The handwriting input method according to claim 11, wherein said primitive figure is represented by said processor with parameters.

* * * * *